US012269284B2

(12) United States Patent
Peterson

(10) Patent No.: US 12,269,284 B2
(45) Date of Patent: Apr. 8, 2025

(54) GIFT APPARATUSES WITH PRACTICAL JOKE FEATURE

(71) Applicant: Wolf Punch, Inc., Orange, CA (US)

(72) Inventor: Travis Walker Peterson, Orange, CA (US)

(73) Assignee: Wolf Punch, Inc., Orange, CA (US)

( * ) Notice: Subject to any disclaimer, the term of this patent is extended or adjusted under 35 U.S.C. 154(b) by 252 days.

(21) Appl. No.: 17/890,986

(22) Filed: Aug. 18, 2022

(65) Prior Publication Data

US 2023/0057381 A1 Feb. 23, 2023

Related U.S. Application Data

(60) Provisional application No. 63/235,626, filed on Aug. 20, 2021.

(51) Int. Cl.
*B42D 15/02* (2006.01)

(52) U.S. Cl.
CPC .................................. *B42D 15/022* (2013.01)

(58) Field of Classification Search
CPC ........ G09F 1/04; B42D 15/022; B42D 15/045
See application file for complete search history.

(56) References Cited

U.S. PATENT DOCUMENTS 4,363,081 A * 12/1982 Wilbur ................. B42D 15/022 362/800
4,484,768 A * 11/1984 Norfleet ............... B42D 15/045 428/317.1
4,787,160 A * 11/1988 Balsamo .............. B42D 15/045 283/117
4,979,171 A 12/1990 Ashley
5,199,745 A * 4/1993 Balsamo ................... G09F 1/04 283/117
5,263,890 A * 11/1993 Dent, IV ................ A63H 37/00 40/124.06

(Continued)

FOREIGN PATENT DOCUMENTS

GB 2279787 1/1995

OTHER PUBLICATIONS

Red River Paper, 881b Polar Matter Magna Card Stock, Aug. 30, 2014, pp. 1-5, https://web.archive.Org/web/20140830170121/http://www.redrivercatalog.com/browse/961b-polar-matte-magnum-photo-inkjet-card-stock-paper.htnnl (Year: 2014).

(Continued)

*Primary Examiner* — David R Dunn
*Assistant Examiner* — Christopher E Veraa
(74) *Attorney, Agent, or Firm* — Knobbe, Martens, Olson & Bear, LLP

(57) ABSTRACT

Some embodiments provide a greeting card or a postcard with a practical joke feature. The practical joke feature can include a sound that is repeatedly played for several hours, days, weeks, etc. The card can include a mode of operation configured to allow a purchaser to experience the sound without arming the practical joke feature. The card can include a pouch that contains one or more surprises for card recipients that attempt to open or destroy the card. The card can include one or more features that resist destruction of the card and/or internal components of the card that implement the practical joke feature.

20 Claims, 19 Drawing Sheets

(56) References Cited

U.S. PATENT DOCUMENTS

| | | | | | |
|---|---|---|---|---|---|
| 5,657,875 | A * | 8/1997 | Hirsh, III | B65D 81/368 | 206/215 |
| 5,719,920 | A * | 2/1998 | Harman | G09F 25/00 | 379/88.07 |
| 5,852,889 | A * | 12/1998 | Rinaldi | B42D 15/045 | 40/124.11 |
| 6,869,369 | B2 * | 3/2005 | Fairweather | A63H 37/00 | 472/52 |
| 7,322,134 | B2 | 1/2008 | Cheek et al. | | |
| 9,027,269 | B2 * | 5/2015 | Budzar | B42D 15/022 | 40/124.06 |
| 9,592,933 | B1 * | 3/2017 | Campbell | B65D 33/12 | |
| 10,625,531 | B1 * | 4/2020 | Peterson | B42D 15/042 | |
| 11,376,881 | B2 * | 7/2022 | Peterson | G09F 1/04 | |
| 2010/0223821 | A1 * | 9/2010 | Bogal | A47G 33/0845 | 40/124.06 |
| 2011/0247247 | A1 | 10/2011 | Mayer et al. | | |
| 2012/0236690 | A1 | 9/2012 | Rader | | |
| 2013/0263481 | A1 * | 10/2013 | Nwosu | B42D 15/045 | 40/124.06 |
| 2013/0283651 | A1 | 10/2013 | Marsh et al. | | |
| 2019/0272733 | A1 | 9/2019 | King | | |

OTHER PUBLICATIONS https://web.archive.Org/web/20160406012917/http://www.thimblepress.com/product/thanks-confetti-card/ saved by Archive.org on Apr. 6, 2016.

https://web.archive.Org/web/20160406042952/http://www.thimblepress. com/product/ratte-and-roll-confetti-card/ saved by Archive.org on Apr. 6, 2016.

https://web.archive.org/web/20160617203008/https:/www.thimblepress. com/shop/product-category/party-goods/confetti-card/ saved by Archive, org Jun. 17, 2016.

https://web.archive.Org/web/20160405181418/http://www.thimblepress. com/product/happy -birthday-confetti-card/ savedbyArchive.org on Apr. 5, 2016.

https://web.archive.Org/web/20160316021605/http://www.thimblepress.com/product/love-confetti-card/ saved by Archive.org on Mar. 16, 2016.

https://web.archive.org/web/20160617203008/https://www.thimblepress. com/shop/product-category/party-goods/confetti-cards/ saved by Archive.org on Jun. 17, 2016.

https://web.archive.Org/web/20160318034621/http://www.thimblepress.com/product/celebration-confetti-card saved by Archive.org on Mar. 18, 2016.

* cited by examiner

GIFT APPARATUSES WITH PRACTICAL JOKE FEATURE

CROSS-REFERENCE TO RELATED APPLICATIONS

This application is a nonprovisional patent application claiming the priority benefit from U.S. Provisional Application No. 63/235,626, filed Aug. 20, 2021, the entirety of which are hereby incorporated by reference herein.

BACKGROUND

Technical Field

This disclosure is related to greeting cards, envelopes, gift boxes, postcards, and other products with printed messages or indicia.

Description of Related Art

Greeting cards and postcards can take the form of a folded piece of paper, heavy paper stock, cardboard, or another medium capable of being printed upon. Greeting cards typically can be inserted into an envelope and mailed. A greeting card or postcard can have a theme (e.g., Christmas) and may contain theme associated printed text or messages (e.g., Merry Christmas) and indicia (e.g., a snowman). When included in a greeting card or postcard, such themed indicia and printed information increases the card's whimsical and festive nature by increasing the functionality of the card in certain circumstances.

A gift can be packaged in various ways, such as by being wrapped in wrapping paper or presented within a gift bag. Conventional wrapping paper has become less popular recently, as people have come to prefer alternatives such as gift bags. One reason for this development is that gift wrapping is labor-intensive to prepare the gift for presentation, and may also require extensive clean-up. In addition, gift wrapping requires additional materials, such as a sturdy box to contain the gift and packaging materials such as tape. Gift bags may be alternatively used instead of wrapping paper, as they are more convenient and can be reused. However, gift bags also typically require additional materials such as tissue paper, and may inadvertently expose the concealed present to the gift recipient before the intended time.

To address the above drawbacks of gift wrapping and gift bags, gift packages having a rectangular or cubical structure made of a folded piece of paper, heavy paper stock, cardboard, or another medium may be used. Gift boxes are sturdier than gift bags such that heavy gifts can be securely stored without being exposed. Further, gift boxes can have a theme similar to gift bags or can have customized themes as desired. For these reasons and additional benefits, gift boxes have become increasingly used as a means of bestowing gifts upon people.

SUMMARY

The present disclosure relates to an apparatus for containing a gift or card or other device that is capable of playing a sound, such as when the apparatus is opened. The apparatus may be configured to be controlled to play a sound differently based on a mode of operation.

In some aspects, the present disclosure provides an apparatus configured to reveal a payload in response to a separation of a separable coupling and continuously play a pre-recorded sound through a speaker until a battery is discharged, the apparatus comprising: a first panel comprising a first inner surface; a second panel comprising a second inner surface; a first pouch disposed along the first inner surface, the first pouch comprising a separable coupling along a surface of the first pouch, the separable coupling configured to reveal a payload in response to a separation of the separable coupling; a second pouch comprising: the speaker; a controller coupled to the speaker, wherein the controller implements a temporary mode of operation and a permanent mode of operation, and wherein, in the temporary mode of operation, the controller is configured to play the pre-recorded sound through the speaker for less than 10 minutes; and the battery configured to provide electric power to the controller, wherein, in the permanent mode of operation, the controller is configured to continuously play the pre-recorded sound through the speaker until the battery is discharged; and a mode of operation switch operatively coupled to the controller, wherein, in response to a user operating the mode of operation switch, the controller is configured to switch from the temporary mode of operation to the permanent mode of operation, wherein, after the user operates the mode of operation switch, the mode of operation switch cannot be switched from the permanent mode of operation to the temporary mode of operation, and wherein the pre-recorded sound cannot be turned off via user operation of the mode of operation switch.

DETAILED DESCRIPTION

Example embodiments described herein have several features, no single one of which is indispensable or solely responsible for their desirable attributes. Without limiting the scope of the claims, some of the advantageous features of some embodiments will be described.

Some embodiments provide a greeting card or a postcard with a practical joke feature. The practical joke feature can include a sound that is repeatedly played for several hours, days, weeks, etc. The card can include a mode of operation configured to allow a purchaser to experience the sound without arming the practical joke feature. The card can include a pouch that contains one or more surprises for card recipients that attempt to open or destroy the card. The card can include one or more features that resist destruction of the card and/or internal components of the card that implement the practical joke feature.

Figure 1:
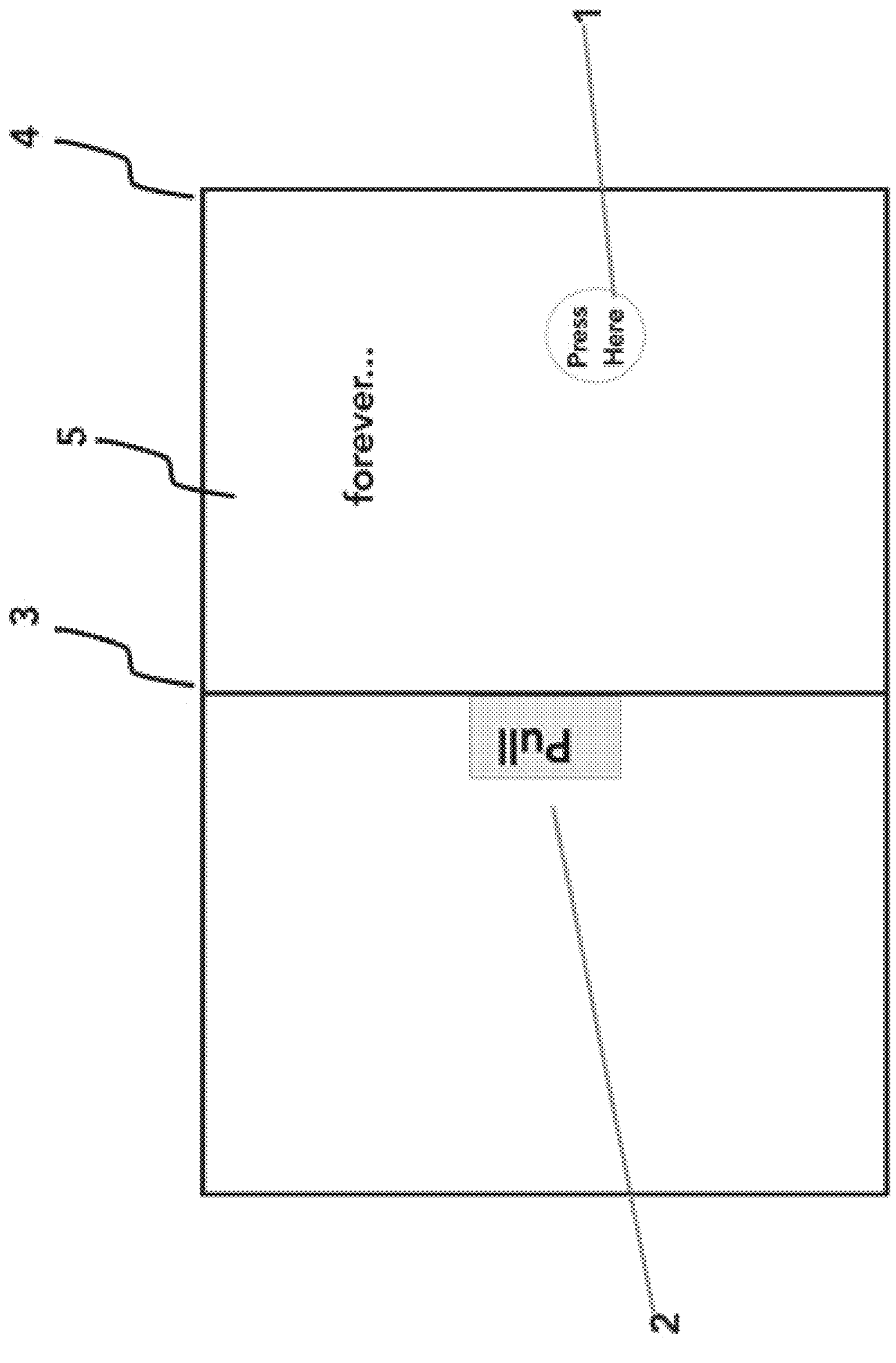
FIG. 1 shows a view of an unfolded greeting card embodiment with a removable tab for activating a practical joke feature.

FIG. 1 is a view of an unfolded greeting card embodiment with a removable tab for activating a practical joke feature. The unfolded greeting card can have one or more than one practical joke feature. The card can be divided into two or more sections separated by a fold 3. A section of the card can include one or more than one layer of material. For example, a section can include an inside layer 5 of material. When the card is folded, the inside layer 5 is between a front outer layer (not shown) and a back outer layer (not shown), and any themed indicia or information printed on the inside layer 5 are not visible. The card can be made from any suitable materials, including, for example, paper, cardstock, others material used to make greeting cards, or a combination of materials. The inside layer 5 and the outer layer of the card can meet at a seam or fold 4. One or more circuits, transducers (such as, for example, speakers), power sources, or other electronics can be disposed between the inside layer 5 and the outer layer of the card, and can be obscured from view whether the card is folded or unfolded. In some embodiments, the inside layer 5 and the outer layer are fastened together along at least a portion of the outer periphery of the card. The layers can be fastened by any suitable technique, including techniques using adhesive, matched tabs and slots, hook-and-loop fasteners, rivets, other fasteners, or a combination of any two or more fasteners. In the illustrated embodiment, the fold 3 is disposed at or near a midpoint between the outer left periphery and the outer right periphery of the card. One or more layers of the card can be scored or bent at the fold 3.

In the embodiment illustrated in FIG. 1, the card includes a mode of operation switch (such as, for example, a tab 2) configured to change the mode of operation of the card from a state where a pre-recorded sound can be listened to one or more times according to the purchaser's preference to a state where the pre-recorded sound cannot be turned off once the card is opened. The tab 2 can be removed by a purchaser of the card before the card is given or mailed to a recipient. In certain embodiments, the mode of operation switch can only be operated once. In such embodiments, once the mode of operation of the card is changed, the mode of operation switch cannot return the card to its original mode of operation.

In some embodiments, the tab 2 is mechanically attached to a controller that implements at least two modes of card operation. The at least two modes of card operation can include a first mode of operation, or temporary mode. In the temporary mode, the card is configured to play a sound once or more than once, but for less than 10 minutes, less than 5 minutes, or less than 90 seconds when a user interface element (such as, for example, a button 1) is operated. In some embodiments, the card operates in the temporary mode until the tab 2 is removed. The tab 2 can be made of paper or another suitable material that can attach to the controller and be removed by the user. In some embodiments, the tab 2 is perforated and attached to the inside layer 5. The tab 2 can protrude through a slit or opening in the inside layer 5. In some embodiments, while the tab 2 is attached to the card, and whether the card is open or closed, the play button 1 can be pressed, and the controller will play one full loop of a pre-recorded sound. The pre-recorded sound can last 0.0001 seconds-90.00 seconds.

Figure 2:
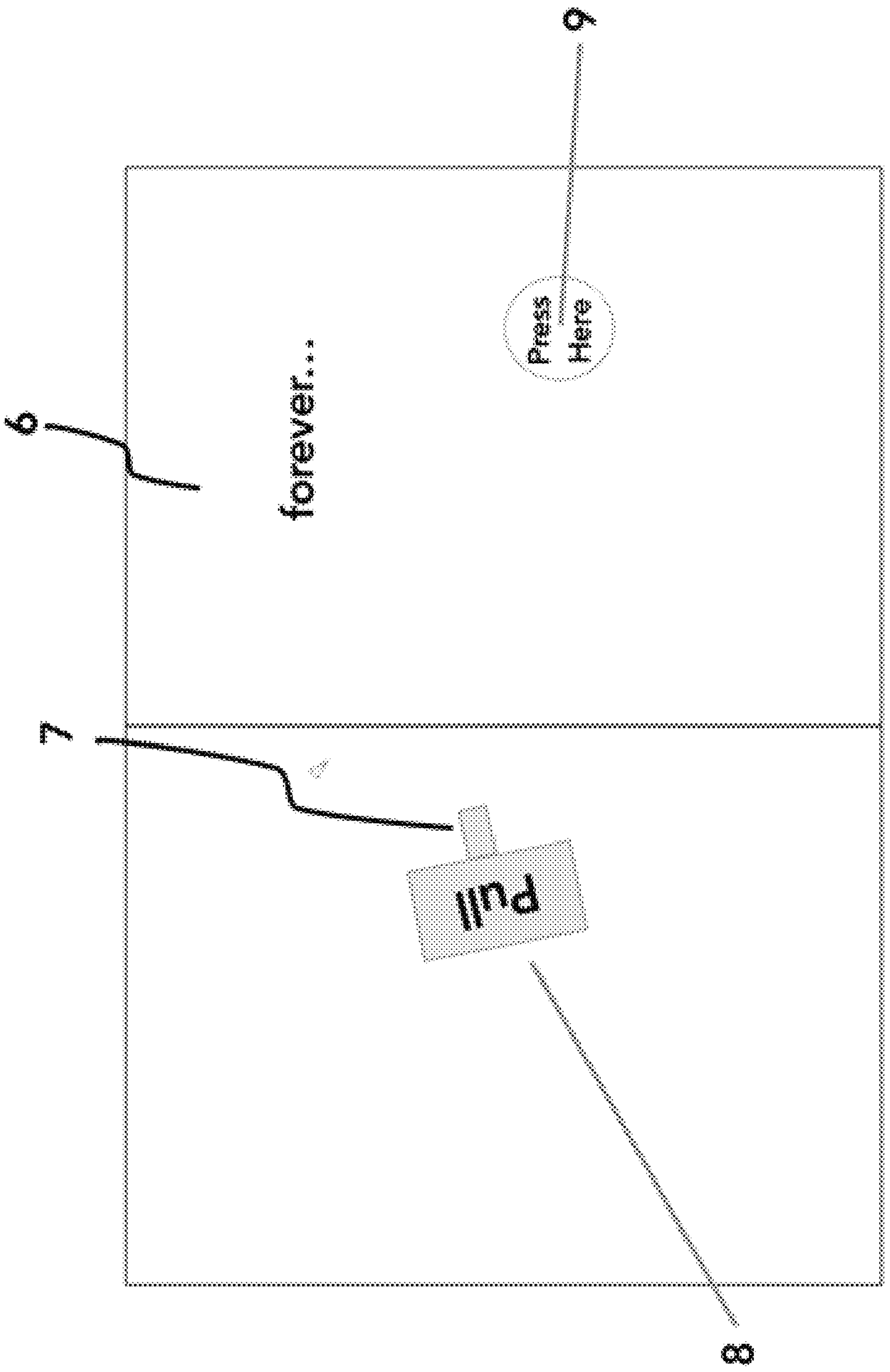
FIG. 2 shows a view of the embodiment of FIG. 1 with the tab removed.

FIG. 2 shows a view of the embodiment of FIG. 1 with the tab 2 (which is numbered as tab 8 in FIG. 2) shown in FIG. 1 removed. The tab 8 is configured to detach from the inside layer 6 (which is numbered as inside layer 5 in FIG. 1) when it is pulled outward. When the tab 8 is detached, the controller is placed in a second mode of operation. This can be accomplished by any suitable technique. For example, the tab 8 can attach to a safety switch (such as, for example, a plastic member 7). The safety switch 7 is configured to keep the card in temporary mode before the mode of operation switch is operated. When the safety switch 7 is removed, the card is placed into a second mode of operation (or permanent mode). In the permanent mode, a trigger for a user interface element (such as, for example, the play button 9, which is numbered as button 1 in FIG. 1) is activated, and the card is configured to play a pre-recorded loop of sound until the battery is drained. In some embodiments, the sound is initiated by operating the user interface element after the mode of operation switch is activated. In other embodiments, the sound is initiated by unfolding the card after the mode of operation switch is activated. In certain embodiments, the controller of the card is configured to raise the volume of the sound when the button 9 is pressed one or more times after the sound is initiated.

In some embodiments, the card has a controller configured to play a pre-recorded sound one time when the button or other sound-stop user interface element is pressed while the card is in temporary mode. The controller is configured to play the pre-recorded sound continuously in a loop until the batteries are drained after the sound is initiated while the card is in permanent mode. In some embodiments, the controller is configured to intermittently play the pre-recorded sound in a loop until the battery is drained. For example, the controller can play the pre-recorded sound in a random manner. In some embodiments, a button can control the pre-recorded sound even in a permanent mode of operation. For example, the button can temporarily pause or permanently end the controller from playing the pre-recorded sound. The button can pause the pre-recorded sound for 30 seconds, 1 minute, a random duration or any other duration. In some embodiments, the controller increases the volume of the pre-recorded sound during play of the pre-recorded sound. In some embodiments, the battery is configured to power the card for greater than or equal to about 1 hour, greater than or equal to about 2 hours, greater than or equal to about 3 hours, greater than or equal to about 4 hours, less than or equal to about 10 hours, or for a period of time between any of the preceding values.

Figure 3:
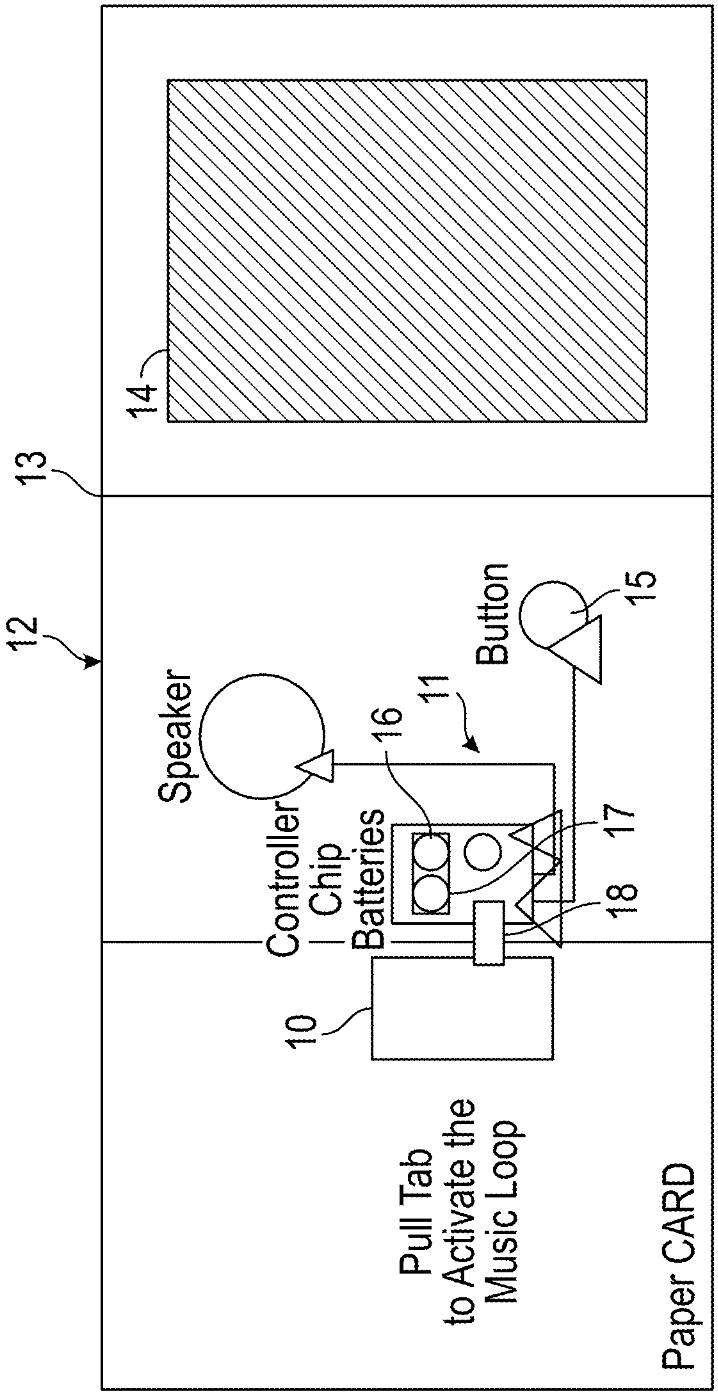
FIG. 3 shows a view of internal components of the embodiment shown in FIG. 1.

FIG. 3 shows a view of internal components of the greeting card embodiment shown in FIG. 1. The card 12 can include internal components positioned between the inner layer 5 and the outer layer of the card. In some embodiments, the components include wires 11, batteries 16, battery management circuit 17, and other components that can fail when exposed to impacts, drops, kicks, and other forces. The card can include features that protect the wires 11, batteries 16, connections, and other sensitive circuit elements. For example, padding can be placed between sensitive circuit elements (e.g., 11, 15, and 17) and at least one of the card layers so that the card can withstand significant impact forces without component failure.

In certain embodiments, the card is configured to hold a substantial quantity of small particles (such as, for example, glitter or confetti) without permitting the small particles to fall out of the card.

In some embodiments, the card 12 includes a pouch 14 for holding items inside of the card that can be revealed when the card is ripped or otherwise destroyed. The pouch 14 can be attached to the card using any suitable technique. For example, the pouch 14 can be glued to a layer of the card around at least a portion of the periphery of the pouch 14. The pouch 14 can be constructed from any suitable material capable of being ripped by a human of average strength. For example, the pouch 14 can be made of soft tissue paper. In certain embodiments, the pouch 14 is sized to hold a substantial quantity small particles, such as glitter or confetti; small toys; stickers; press-on tattoos; candy; ribbons; paper with printed messages such as fortunes; bubble wrap; other tangible items; or a combination of items. The pouch 14 can be made from paper weighing between 5-50 grams per square meter, paper weighing between 10-20 grams per square meter (g/m^2 or gsm), or another material that breaks easily when the card is opened up or ripped apart. Some embodiments are configured such that the pouch tears apart if the card is opened from the front, opened from the back, or ripped down the middle. The pouch 14 can be concealed such that the pouch 14 cannot be seen by looking at the exterior of the card.

The card can include a power source 16 that is configured to power the electronic components of the card for greater than or equal to about 3 hours, greater than or equal to about 4 hours, less than or equal to about 10 hours, and/or less than or equal to about 24 hours. For example, the power source 16 can include three AG10 batteries or another battery configuration selected such that the thickness of the card when folded is less than or equal to 10 mm, less than or equal to 6 mm, less than or equal to 5 mm, less than or equal to 4 mm, greater than or equal to 3 mm, and/or within a range between any of the preceding values. The card can include a fold line 13 that permits the pouch 14 and the internal components of the card to be hidden from view when the card is folded. One or more fasteners can be used to connect the inner layer of the card to the outer layer of the card when the card is folded at the fold line 13. The card 12 can have any dimensions suitable for a greeting card, such as, for example, 5×7 inches. The card can be made of card stock, paper, another material suitable for printed messages or indicia, or a combination of materials. In some embodiments, the mode of operation switch 10 (which is numbered as tab 8 in FIG. 2 and as tab 2 in FIG. 1) is attached to an electrical insulator 18 separates leads in a circuit that activates the permanent mode when the circuit is closed by removal of the insulator 18.

Figure 4:
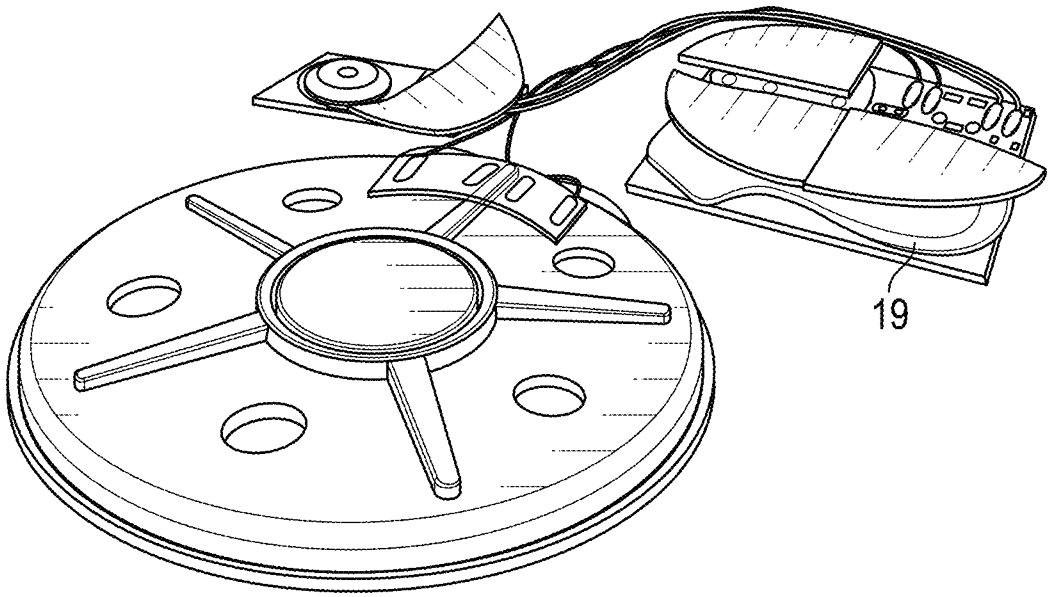
FIG. 4 shows a view of internal components of the embodiment shown in FIG. 1 with features that increase the durability of the internal components.

FIG. 4 shows a view of internal components of the embodiment shown in FIG. 1 with features that increase the durability of at least some of the internal components. In the embodiment shown in FIG. 4, a layer of electrically insulating material 19, such as, for example, adhesive, sealant, or encapsulant, is disposed adjacent to, on top of, or around the power source. For example, the material can encapsulate the electrodes of the power source, encapsulate a substantial portion of the power source, or encapsulate substantially all of the power source. The insulating material can assist in maintaining the power source in contact with electric leads and in a sealed condition. The insulating material can keep the card functioning even after the card is hit, thrown, and/or smashed. The insulating material layer can have a thickness that is slightly greater than the thickness of the power source. For example, the thickness of the insulating material layer can be greater than or equal to 2 mm, greater than or equal to 3 mm, greater than or equal to 4 mm, less than or equal to 5 mm, less than or equal to 6 mm, and/or within a range between any of the preceding values.

Figure 5:
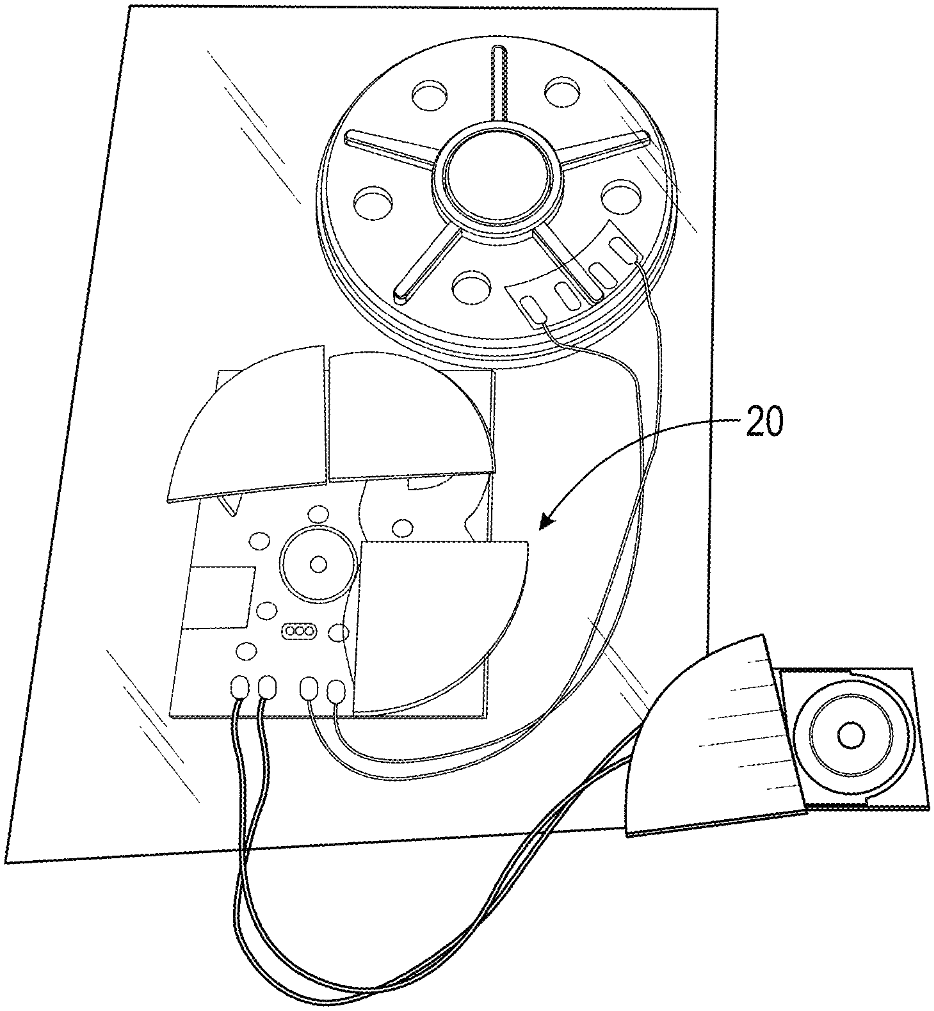
FIG. 5 shows a view of internal components of embodiments disclosed herein with features that increase the durability of the internal components.
Figure 6:
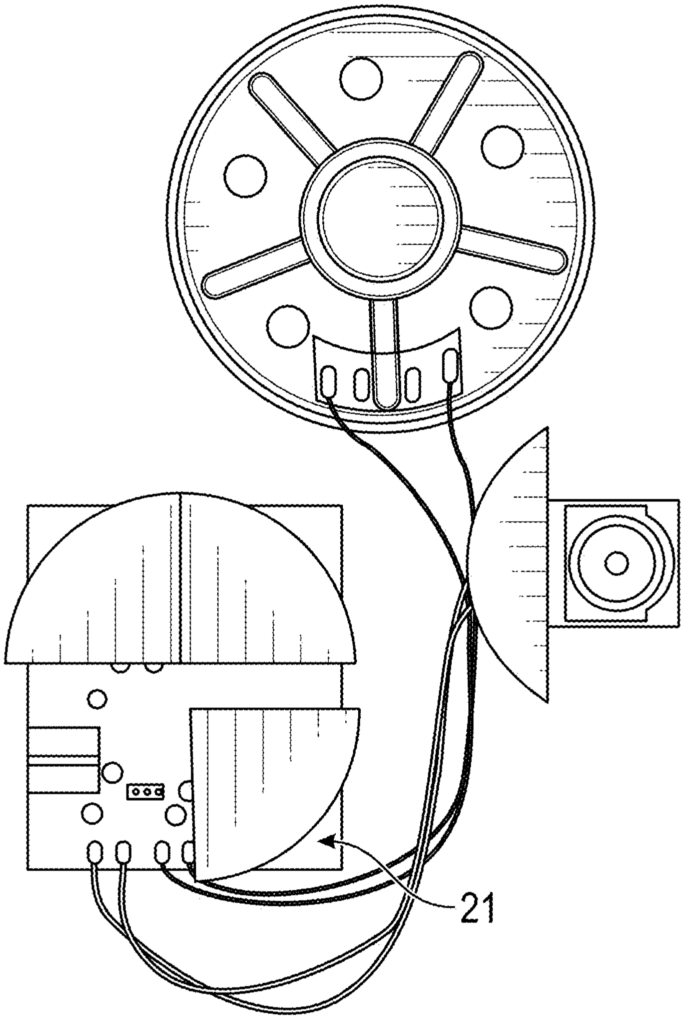
FIG. 6 shows a view of internal components of embodiments disclosed herein with features that increase the durability of the internal components.

FIGS. 5 and 6 show views of internal components of embodiments disclosed herein with additional features that increase the durability of at least some of the internal components. In some embodiments, padding 21 is disposed between the power source and one or more adjacent layers of the card. In some embodiments, the padding 21 is in a layer that is less than 1 mm thick. The padding 21 can have an area that is greater than the area of the adjacent power source, greater than or equal to 150% of the area of the adjacent power source, and/or less than 200% of the area of the adjacent power source. An electrically insulating material 19 can be disposed between the padding 21 and the power source. The padding 21 can reduce or spread out the force transmitted to the power source during an impact on the card, thus increasing the durability of the card's internal components.

In some embodiments, the padding 21 has top and bottom surfaces that are covered with adhesive and/or adhered to adjoining surfaces above and below the padding 21. The padding 21 can thereby provide structure that resists separation of the inner layer from the outer layer of the card by the user. If the card contains a pouch 14, the padding can adhere to the pouch 14 and rip the pouch 14 open when the inner layer and outer layer of the card are separated from each other.

Insulating material 19 and/or padding 21 can also be disposed between the user interface mechanism (such as, for example, button 15 shown in FIG. 3) and one or more layers of the card.

In certain embodiments, insulating material 19 is applied to all soldering points present in the internal components of the card. Wires connecting to the speaker are soldered. The soldering points on the controller that lead to the speaker can be encapsulated with insulating material 19, such as, for example, adhesive.

In some embodiments, a protective enclosure or layer 20 is disposed around or adjacent to at least the controller and the speaker. The protective enclosure or layer 20 can be constructed from a material that resists tearing, thus making it more difficult for the user to stress or break the wires and connections between the controller and the speaker by tearing the card.

Figure 7:
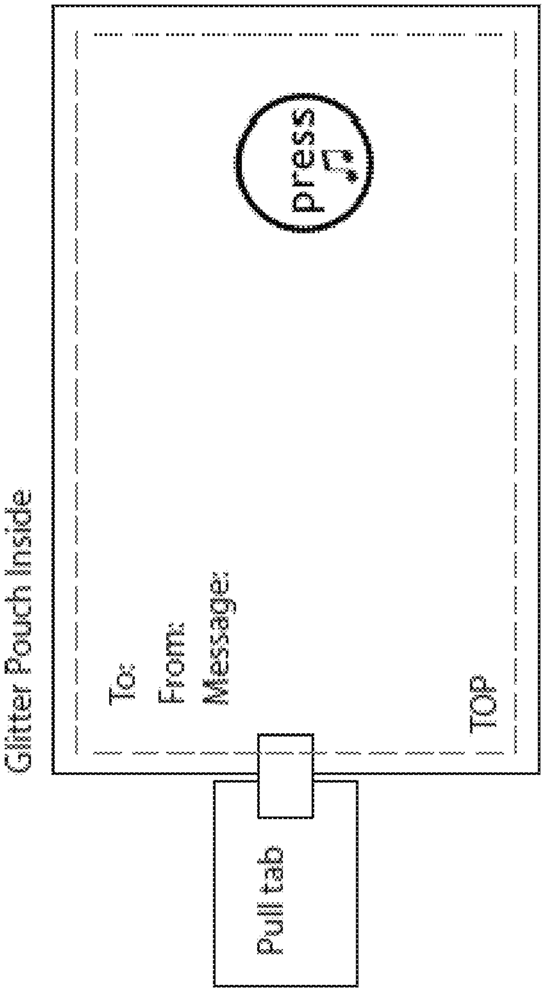
FIG. 7 shows a view of a postcard embodiment with a removable tab for activating a practical joke feature.
Figure 8:
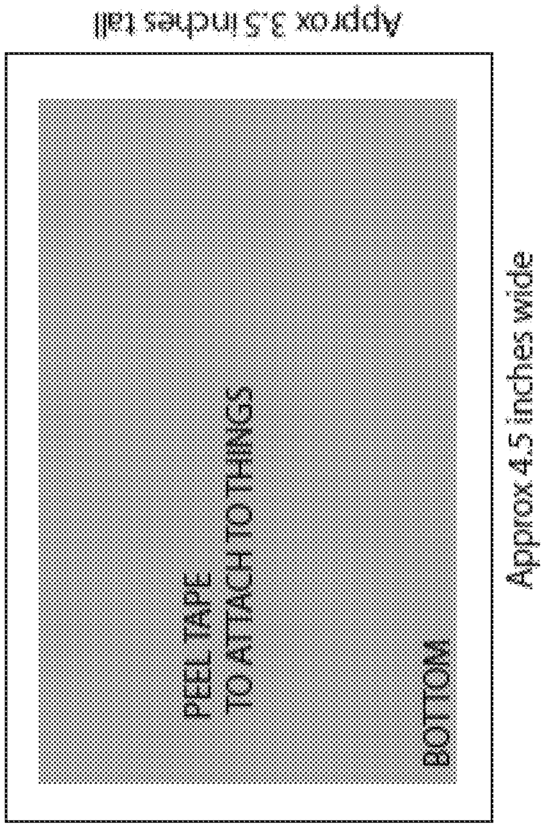
FIG. 8 shows a view of a postcard embodiment with a removable tab for activating a practical joke feature.

FIGS. 7 and 8 show a view of a postcard embodiment with a removable tab for activating a practical joke feature. The postcard can include a top layer with a space for printing or writing a message or indicia, addressee information, and sender information. The top layer can show the location of a user interface element (such as, for example, a button) that can operate in a manner similar to the user interface element described in the greeting card embodiment. The card can include a mode of operation switch (such as, for example, a pull tab) that can operate in a manner similar to the mode of operation switch described in the greeting card embodiment. The card can include a bottom layer with an adhesive layer disposed between the bottom layer of the card and a protective layer. When the protective layer is removed, the card can be fastened to another surface by pressing the adhesive layer against the other surface. The card can include any combination of some or all of the internal components described with respect to the greeting card embodiment, including a pouch, a speaker, a controller, and/or a power source. The internal components can be disposed between the top layer and the bottom layer of the card.

In some embodiments, the postcard includes a controller plays a pre-recorded sound at intervals after the mode of operation switch is activated. For example, the controller can be configured to play a 2-3 second looping chirp every 90 seconds until the battery dies. In certain embodiments, there is a delay between activating the mode of operation switch and initiating playing the pre-recorded sound at intervals. For example, the controller may wait greater than or equal to 1 minute, 90 seconds, 2 minutes, 5 minutes, less than or equal to 10 minutes, less than or equal to 1 hour, a user-selected amount of time, or a period of time between any of the preceding values before initiating playing the pre-recorded sound at intervals. This provides an opportunity for a user of the postcard to leave the area after the card is attached to the bottom of a table, the bottom of a chair, etc., thus providing the user an opportunity to escape and increasing the practical joke value of the postcard. In certain embodiments, the postcard is sized to be difficult to tear and/or destroy. For example, the maximum dimension of the postcard can be less than or equal to about 4.5 inches. The thickness of the postcard can be less than or equal to about 0.25 inches. The thickness of the postcard can taper towards the periphery of the card.

Figure 9:
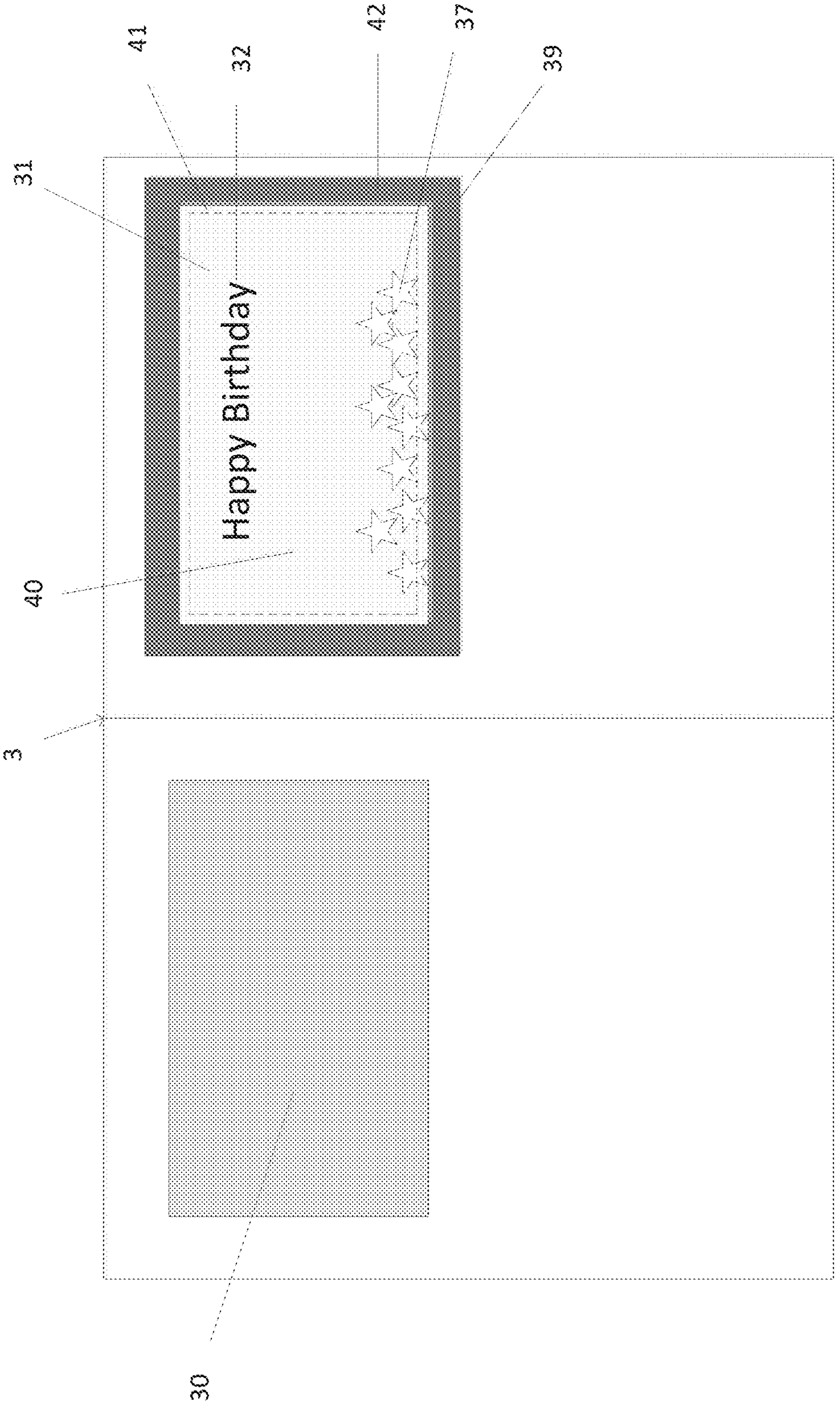
FIG. 9 shows a view of an unfolded greeting card embodiment having two panels and containing a pouch that contains one or more surprises for a card recipient.
Figure 10:
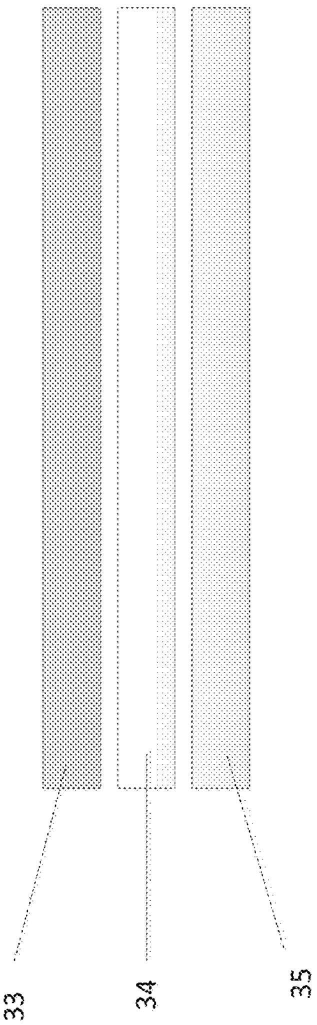
FIG. 10 shows a side view of a first panel of the embodiment of FIG. 9.
Figure 11:
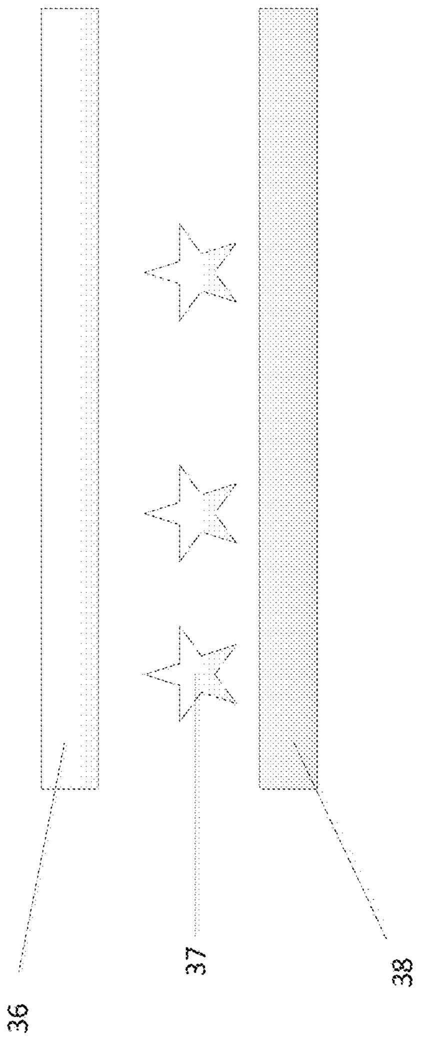
FIG. 11 shows a side view of a second panel of the embodiment of FIG. 9.

FIGS. 9-11 show views of an unfolded greeting card embodiment having two panels and containing a pouch that contains one or more surprises for a card recipient. As is shown in FIG. 9, the greeting card can include a pouch 31 for holding items inside of the card that can be revealed when the greeting card is opened. The pouch 31 can be attached to the card using any suitable technique. For example, at least a periphery 39 of the pouch 31 can be glued, taped, or otherwise attached to a panel of the card. The pouch 31 can also be fastened to at least one panel of the card using matched tabs and slots, hook-and-loop fasteners, rivets, other fasteners, or a combination of any two or more fasteners. In this way, the pouch 31 can be connected to a panel of the greeting card, such that when the panel of the greeting card is moved, all portions of the pouch will correspondingly move along with the panel of the greeting card, unless acted upon by another force. In some embodiments, the greeting card can include a written message 32. For example, the written message 32 can include written text, an illuminated message using light-emitting diodes (LEDs), stickers, or any other message capable of being included in the greeting card.

The panels of the greeting card may be made of card stock paper or any other material capable of being printed upon. When card stock paper is used, it is preferable to use card stock paper weighing at least 200 grams per square meter. Paper weighing greater than or equal to 300 grams per square meter may. Paper weighing greater than or equal to 350 grams per square meter may also be used. Paper weighing less than or equal to 800 grams per square meter may be used.

In some embodiments, the card includes an adhesive element 30 on at least one panel of the card. As is shown in FIG. 10, this adhesive element 30 can include an adhesive portion 34 comprising an adhesive substance that is disposed between a first panel of the card 35 and a protective layer 33. The adhesive portion 34 can take the form of an adhesive pad or strip. When the protective layer 33 is removed, the adhesive portion 34 can be adhered to an outer surface of the pouch 31. In some embodiments, the adhesive element 30 is initially affixed to a first panel of the card and the pouch 31 is initially affixed to a second panel of the card. With the protective layer 33 of the adhesive element 30 removed, the adhesive portion 34 can be adhered to an outer surface of the pouch 31 by closing the card. When the card is subsequently opened by a recipient, the adhesive portion 34 which is adhered to the pouch 31 causes the pouch to rip, thereby allowing the contents of the pouch 31 to spill out. The pouch 31 can include one or more separable or separating regions configured to easily and predictably produce a separation or split or tear or divide or rupture in the pouch when the greeting card is opened by a receiver of the greeting card. For example, the one or more separable or separating regions can be one or more perforations or one or more break-away portions. For example, as is shown in FIG. 9, the pouch can comprise a first portion 42 of the pouch that is firmly secured to a panel of the greeting card by any suitable means, including glue, tape, or an adhesive band. A perforated portion 41 having perforations can be disposed inside the first portion to allow for easy breaking open of the pouch. The perforated portion is configured to permit a receiver of the card to open the card without realizing the practical joke feature of the card. The perforated region permits the recipient to unfold the greeting card without initially realizing that the adhesive portion 34 has been adhered to at least a portion of the pouch.

The perforated portion 41 defines a closed shape, such as a square, circle, triangle, rectangle, star, or other shape. At least part of the perforated portion 41 actually contains perforations. Typically, the perforations of the perforated portion 41 will comprise greater than 30 percent of the space contained within the perforated portion. Optionally, the perforations can comprise greater than 50 percent of the space of the perforated portion. The perforations can comprise less than 80 percent of the space of the perforated portion. A second portion 40 of the pouch can be disposed inside the perforated portion 41. A sub-portion of the perforated portion 41 that actually contains perforations can optionally form a closed shape, such as a circle, square, triangle, or rectangle or a shape that is not a closed figure, such as, for example, a U-shape. The second portion 40 of the pouch can be configured and spaced to adhere to at least a portion of the adhesive element 30 when the greeting card is folded by a sender of the greeting card and the protective layer 33 is removed.

In some embodiments, the pouch 31 and the adhesive element 30 are spaced relative to each other such that when the greeting card is closed, the adhesive element 30 contacts the pouch 31. In some embodiments, the adhesive element will contact only the second portion 40 of the pouch 31. This is so that when the protective layer 33 is removed, the adhesive substance will adhere only to the second portion of the pouch, making the card easy for the recipient to open without realizing the practical joke feature of the gift card. In other embodiments, the adhesive element can adhere to only an insubstantial portion of the first portion 42 of the pouch 31 when the card is folded, wherein an insubstantial portion is a portion that is small enough that the receiver of the gift card will not be made aware of the practical joke feature of the card when opening the card.

In some embodiments, the pouch 31 can be ripped open to reveal a message printed on the second panel that was originally at least partially obscured by the pouch 31. For this purpose, the pouch material can be at least partially opaque. The outer surface of the pouch 31 can be at least partially constructed from any suitable material capable of being easily torn when the card is opened. For example, the pouch can be at least partially made of paper weighing between 5-75 grams per square meter, paper weighing between 10-20 grams per square meter, or another material that breaks easily when the card is opened up. The pouch may be made of paper that is single ply or multi-ply. The panels of the card are preferably made of a material that is more rigid and durable than the easily torn material of the pouch 31.

The pouch 31 can be filled with a payload comprising any number of objects 37, such as glitter, confetti, small metal or plastic objects, candy, ribbons, small toys, temporary tattoos, papers with printed messages, etc., or any combination of such objects. The pouch 31 can hold a substantial quantity of such objects in order to increase the surprise experienced by the recipient of the card when the pouch is torn open and the contents of the pouch 31 are spilled out. In some embodiments, the pouch can hold only a small quantity of objects 37 in order to minimize the thickness of the card and to minimize suspicion on the part of the recipient.

As is shown in FIG. 11, the pouch 31 can be formed by adhering a top layer 36 of paper or similar material to the second panel 38 of the card. The single sheet of paper 36 is glued, taped, or otherwise attached to the second panel 38 of the card around at least a periphery of the pouch 39 such that the objects 37 are held between the sheet of paper 36 and the second panel 38 of the card before the pouch 31 is torn. Alternatively, the pouch 31 can comprise a bag made of paper or similar material that can hold objects 37 inside. Such a bag can be glued or otherwise attached to the second panel 38 using any suitable technique.

The card can include a fold line 3 that permits the pouch 31 to be hidden from view when the card is folded. The fold line 3 can be disposed at or near a midpoint between the outer left periphery and outer right periphery of the card.

Figure 12:
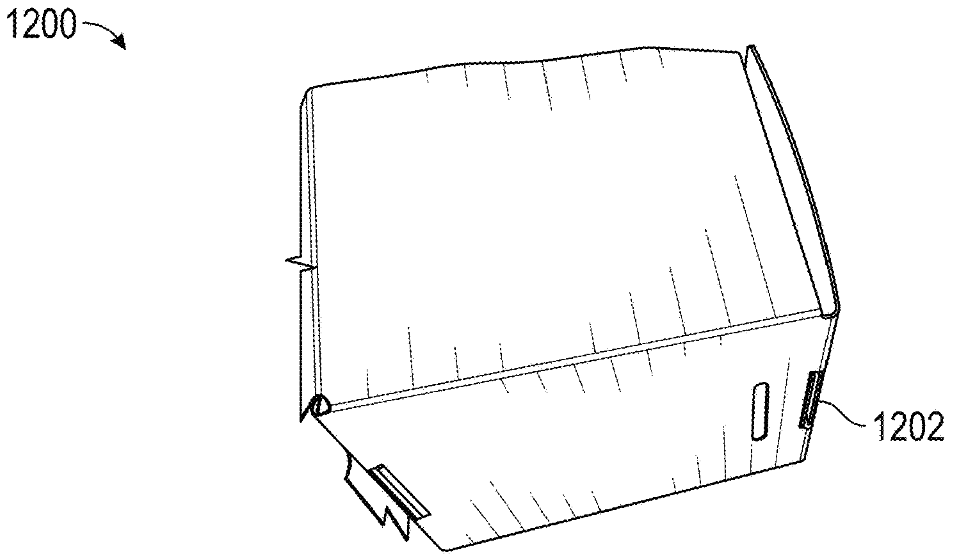
FIG. 12 shows a perspective view of a gift box in a completely closed state according to an exemplary embodiment of the present disclosure.

FIG. 12 is a perspective view of a gift box 1200 in a closed state according to an exemplary embodiment of the present disclosure. The box can be composed of several panels foldably connected to one another. Each panel of the box can include one or more than one layers of material. For example, one or more panels can include an inside layer. The box can be made from any suitable material, including, for example, paper, cardstock, other materials used to assemble gift boxes, or a combination of materials. When the box is in a closed state, the shape thereof may have a cube shape or a cuboid shape where some sides are longer than other sides, creating an internal space therein as a cavity in which an object or objects can be placed. The color or materials being used for the box can be preferably opaque such that the gift inside the gift box is not exposed to the gift recipients until the box is opened. Accordingly, when the box is folded, any themed indicia or information inside the box is also not visible. One or more circuits, transducers (such as, for example, speakers), power sources, or other electronics of a sound playback system can be disposed inside the box to be completely uncovered even when the gift recipients open the box. The box can have any dimensions suitable for a gift box in a cubic shape or cuboid shape. The box can be made of box stock, paper, another material suitable for printed messages or indicia, or a combination of materials.

Describing the panels in more detail, the gift box 1200 according to an exemplary embodiment of the present disclosure may include five panels each of which has respective inner and outer surfaces. Each panel may be coupled to adjacent panel in a length direction when opened along edges therebetween which allow the rotation motion between one panel and adjacent panel. The plurality of panels may be coupled to one or more adjacent panels at each end of the respective panels so as to form a completely closed box, such as shown in FIG. 12. In addition, each panel can include a pair of flaps foldably attached to respectively sides of each panel allowing a complete assembly of the box of FIG. 12. The details of the flaps will be described later.

In some exemplary embodiments, the pull-tab 1202 may be mechanically attached to internal components, e.g., a controller, that implements at least two modes of box operation. The at least two modes of box operation can include a first mode of operation, which can be called a temporary mode or sender mode. In the temporary mode, the box can be configured to play a sound once or more than once, but for less than, for example, 10 minutes, less than 5 minutes, or less than 90 seconds when a user interface element (such as, for example, a button) is operated. This is merely an example, such that the sound can be preconfigured to be played for a certain period of time. For example, the box may be configured to play until at least one of a plurality of stopping criteria is satisfied. One or more stopping criteria may be included in instructions saved on the controller. Different embodiments may include different combinations of one or more stopping criteria taken from a plurality of available stopping criteria. Once the corresponding one or more stopping criteria saved in the controller have been reached, the sound may cease to be played. The plurality of stopping criteria can include, for example, having played a song once through, having played the song two times (or three, or four, etc.) through, having played a sound (e.g., song) for a certain amount of time (e.g., as described herein), a determination that a lid or cover of the box is closed, a user selection of a selector or interaction with a sound-stop user interface element (e.g., pressing a button), and/or some other stopping criteria. Alternatively, the sound may be merely muted or reset after a certain period of time in the temporary mode after opening the box. In some embodiments, the box operates in the temporary mode until the pull-tab 1202 is completely removed from the box. The pull-tab 1202 can be made of paper or another suitable insulated material to be linked with the controller to activate the operation switch and be removed by the user. In some embodiments, the pull-tab 1202 may be covered under the liner. The pull-tab 1202 can protrude through a slit or opening in a liner (e.g., 1312 in FIG. 13). In some embodiments, while the pull-tab 1202 is attached to the box, the controller will play one full loop of a pre-recorded sound, or more. The pre-recorded sound can last 0.1 seconds-90 seconds or more; however, the length of the sound play can be preset as desired.

When the pull-tab 1202 is pulled out of the box, the controller can be placed in a second mode of operation (or permanent mode). In the permanent mode, a trigger for a user interface element may be activated, and the box is configured to play a pre-recorded loop of sound until the battery is drained, or the box is destroyed or damaged beyond an extent by a user. In some embodiments, the sound is initiated by operating the user interface element after the mode of operation switch is activated. In other embodiments, the sound is initiated by opening the box after the mode of operation switch is activated. In certain embodiments, the controller of the box is configured to raise the volume of the sound when the button is pressed one or more times after the sound is initiated.

As described above, the gift box has a controller, having a memory, configured to play a pre-recorded sound at least one time while the box is opened in the temporary mode. On the other hand, the controller is configured to play the pre-recorded sound continuously in a loop until the batteries are drained after the sound is initiated while the box is in the permanent mode. In some embodiments, the battery is configured to power the box for greater than or equal to about 10 minutes, greater than or equal to about 1 hour, greater than or equal to about 2 hours, greater than or equal to about 3 hours, greater than or equal to about 4 hours, less than or equal to about 10 hours or more, or for a period of time between any of the preceding values. In certain embodiments, there is a delay between activating the mode of operation switch and initiating playing the pre-recorded sound at intervals. For example, the controller may wait greater than or equal to 1 second, 15 seconds, 30 seconds, 1 minute, 90 seconds, 2 minutes, 5 minutes, less than or equal to 10 minutes, less than or equal to 1 hour, a user-selected amount of time, or a period of time between any of the preceding values before initiating playing the pre-recorded sound at intervals. In certain embodiments, the maximum dimension of the box can be less than or equal to a predetermined size.

Figure 13:
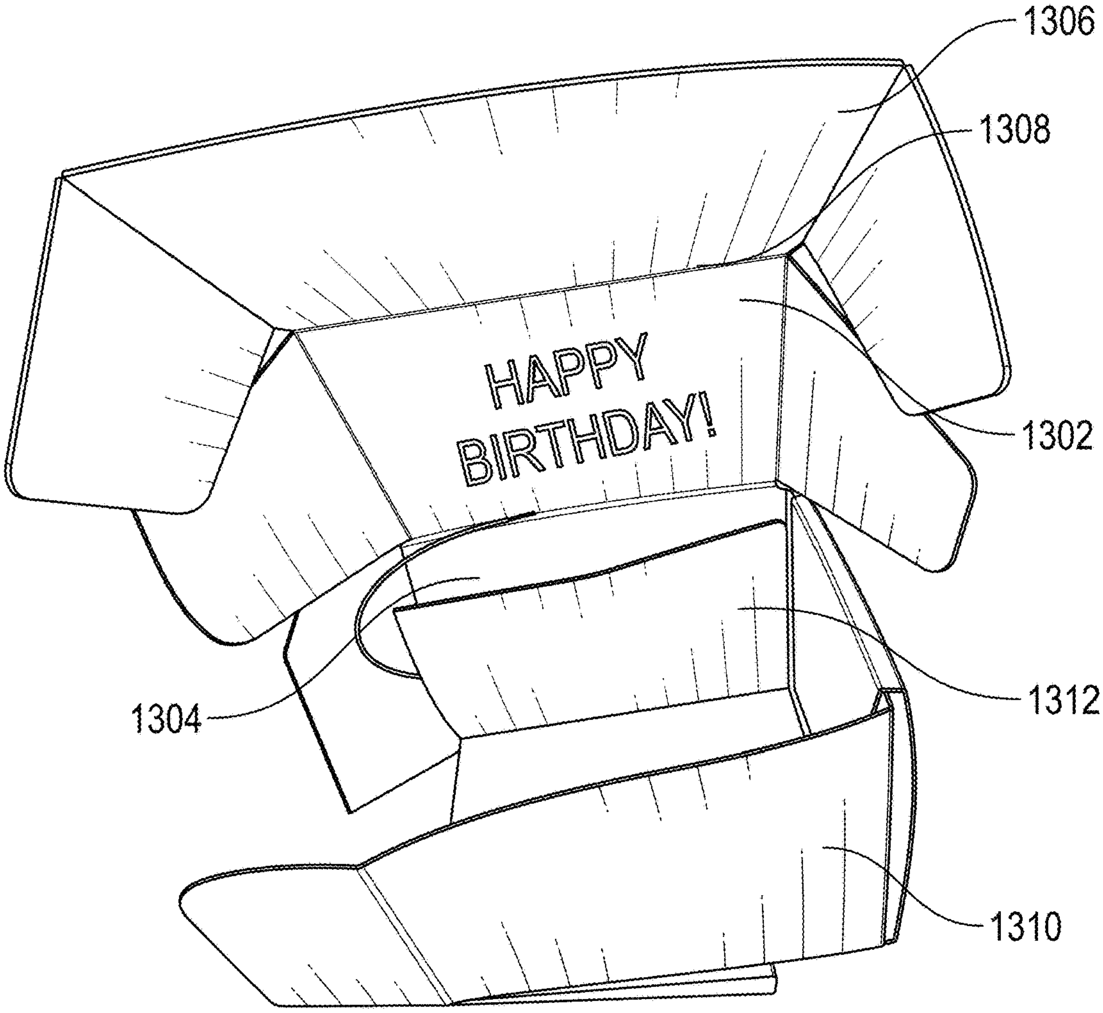
FIG. 13 shows a perspective view of the embodiment of FIG. 12 in a partially opened state.
Figure 15:
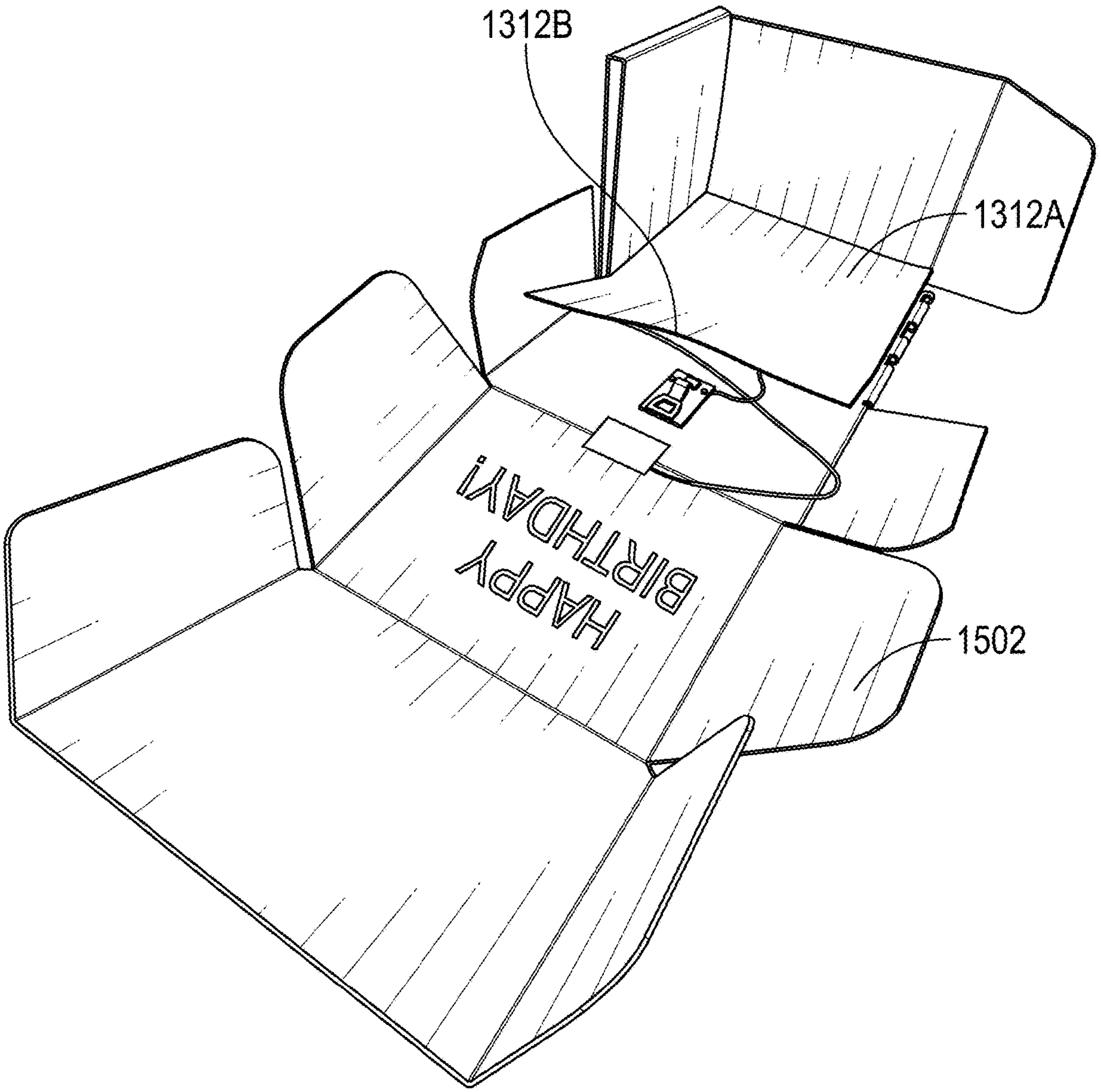
FIG. 15 shows a view of the embodiment of FIG. 12 where the gift box is fully open and the internal components are partially exposed.

FIG. 13 shows a perspective view of the embodiment of FIG. 12 in a partially opened state. Exemplary embodiments are not limited to five panels, such that the number of panels may be less or more than five, based on the size and shape of the box. Among these, a first panel 1302 as shown in FIG. 13 which illustrates a partially opened state of the box may include an inner surface. The inner surface may be integrated onto the first panel 1302 or may be separately formed to be attached to an inner side of the first panel 1302. In some embodiments, the inner surface of the first panel 1302 may have an inside layer adhered thereto for text or messages to be printed (e.g., Happy Birthday). The panels of the box may further include a second panel 1304 having an inner surface in a similar manner to the inner surface of the first panel 1302 and hingedly connected with the first panel to be inwardly and outwardly rotated to be located below the first panel 1302. In addition, the panels may include a cover panel 1306 which may be rotatably coupled with the first panel 1302 in a similar way, which can be in contact with an end panel 1310 by covering an outer surface of the end panel 1310 when the box is in the closed state as shown in FIG. 12. The cover panel 1306 and the end panel 1310 can be arranged at ends of the box, respectively, when the box is opened, longitudinally in an opposite direction. The cover panel 1306 is moveable together with the first panel 1302 between a closed state as shown in FIG. 12, a partially opened state as shown in FIG. 13 and a fully opened state as shown in FIG. 15. According to the present disclosure, the cover panel 1306 can be foldably coupled to the first panel 1302 along an edge 1308 and can move together with the first panel 1302 between the closed position and the partially open position by rotating at least 10° about the edge 1308.

Figure 14:
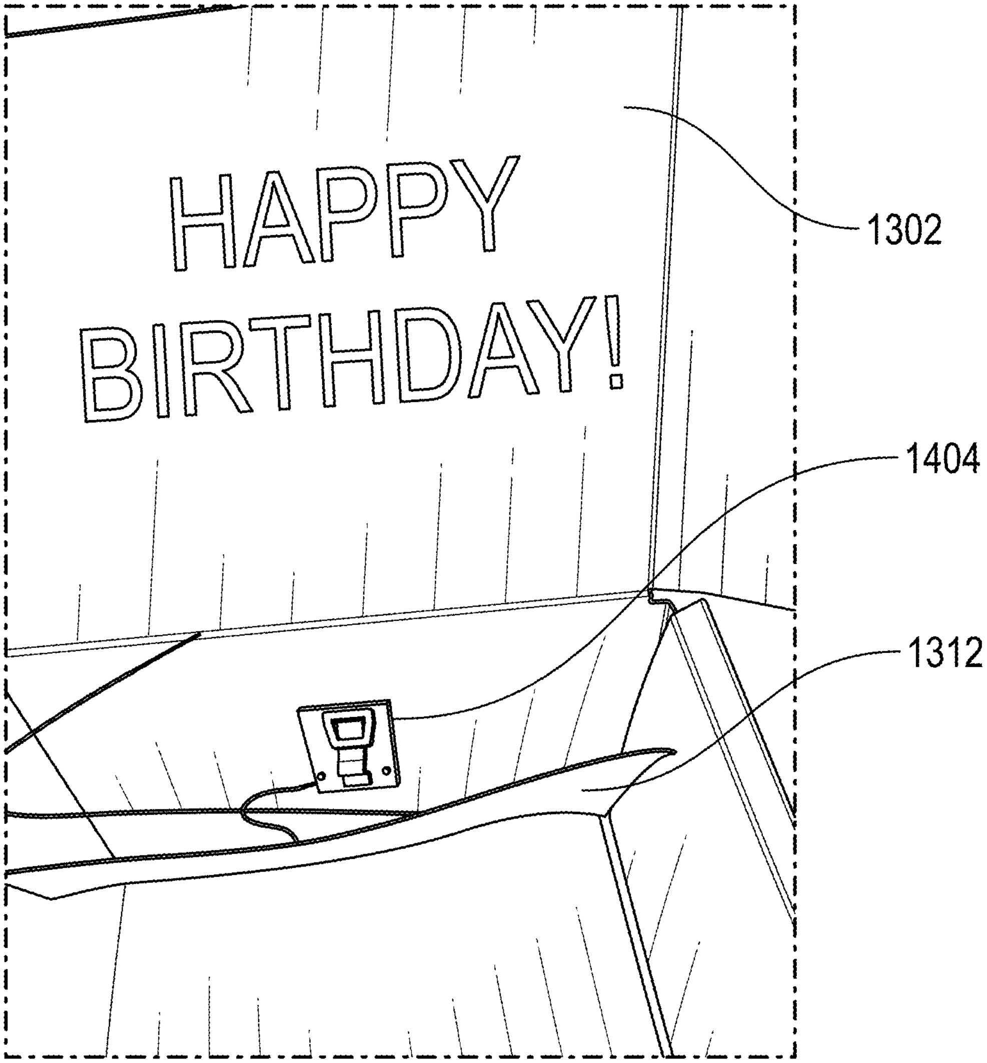
FIG. 14 shows a view where a switch device of the embodiment shown in FIG. 12 are partially exposed.

In some embodiments, with reference to FIG. 13, a liner 1312 may be provided on the inner surfaces of the second panel 1304 so as to provide cover thereto, and may extend further to cover a panel (e.g., a third panel 1702 in FIG. 17) foldably coupled between the second panel 1304 and the end panel 1310. Referring to FIG. 14, one or more circuits, transducers (such as, for example, speakers), power sources, or other electronics can be disposed on a third panel foldably connected between the end panel 1310 and the second panel 1304, and can be covered by the liner 1312 covering the inner surfaces of the second and third panels 1304, 1702. As will be described further, a plurality of internal components of a sound playback system, including the one or more circuits, transducers (such as, for example, speakers), power sources, switches, or other electronics, can be arranged between the liner 1312 and the third panel (for example, the third panel 1702 in FIG. 17) and/or second panel 1304 in a way that the plurality of internal components can be obscured from view whether the box is opened or closed. In some embodiments, the liner 1312 and the third panel and/or the second panel 1304 are fastened together along at least a portion of the outer periphery of the box. The liner 1312 and the panels, including the second panel 1304 and third panel can be fastened by using, for example, adhesive, matched tabs and slots, hook-and-loop fasteners, rivets, other fasteners, or a combination of any two or more fasteners. In the illustrated embodiment, the liner 1312 may include two panels (e.g., 1312A, 1312B in FIG. 15) respectively covering the inner surfaces of the second and third panels and may be foldable coupled to each other to correspond the second panel and third panel. The panels of the liner 1312 may be folded and detachably cover the second panel 1304 and third panel, respectively, such that when the box is opened, gift recipients would not be able to distinguish the liner 1312 from the second panel 1304 and third panel of the box.

In addition, FIGS. 14-19 show internal components of the gift box embodiment shown in FIG. 12. The box can include internal components arranged between the liner 1312 and the panels (second and third panels 2, 3) of the box. In some embodiments, the components include wires, batteries, and other components that can fail when exposed to impacts, drops, kicks, and other forces. The box can include features that protect the wires, batteries, connections, and other sensitive circuit elements. For example, a substrate such as a printed circuit board (PCB) substrate can be placed between sensitive circuit elements and at least one of the box layers so that the box can withstand significant impact forces without component failure.

Figure 17:
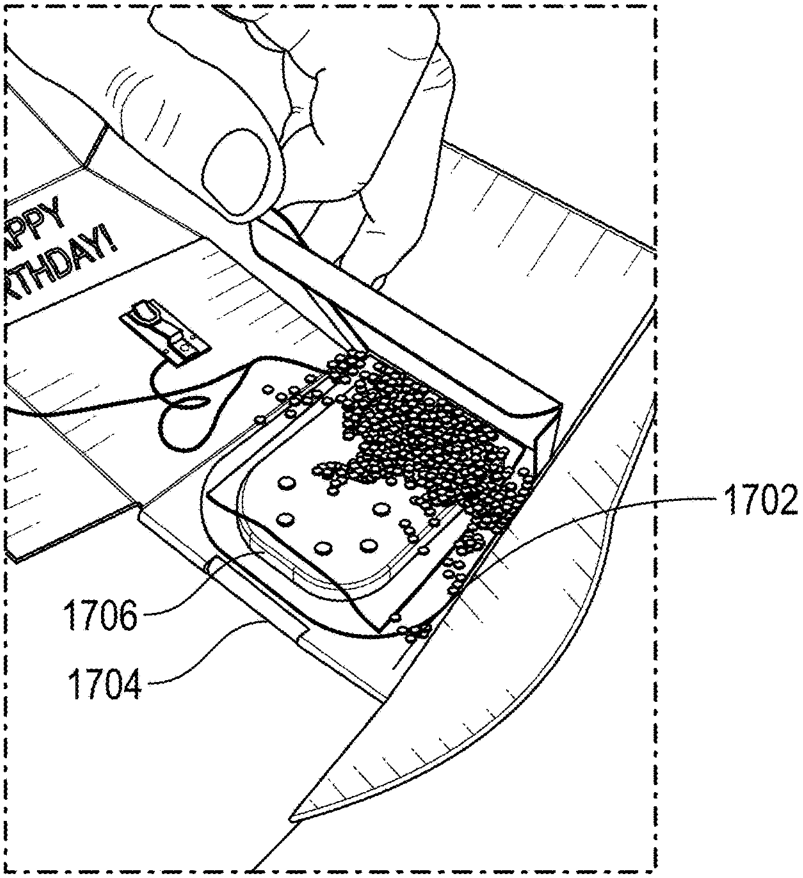
FIG. 17 shows a view of completely opened gift box embodiment having two panels and containing a pouch that contains one or more surprises for a gift box recipient.
Figure 19:
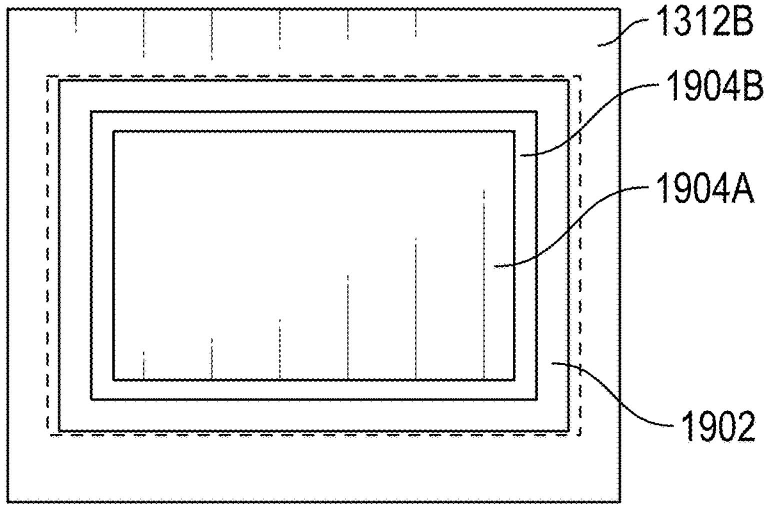
FIG. 19 shows a view of a pouch that contains one or more surprises for a gift recipient and is hidden under a panel of the gift box of FIG. 12.

In certain embodiments, the box is configured to hold a substantial quantity of small particles (such as, for example, glitter or confetti) without permitting the small particles to fall out of the box. In some embodiments, the box includes a pouch 1902 for holding items inside of the box that can be revealed when the box is ripped or otherwise destroyed. The pouch 1902 can be attached to the box, for example, one side of the pouch 1902 can be attached to an inner surface of the liner 1312 and another side of the pouch 1902 can be attached to the inner surface of the third panel 1702, more specifically, an internal components cover (e.g., the internal components cover 1706 in FIG. 17) which will be described later in more detail. In some embodiments, the liner 1312 may be composed of two panels, as described above, an upper liner 1312A and a lower liner 1312B foldably coupled to the upper line 1312A, and the lower liner 1312B may have flaps at one or more ends to be folded inwardly toward the third panel 1702 as shown in FIG. 17 so as to create an enclosed space under the lower liner 1312B for the internal components cover 1706 and the pouch 1902 to be disposed therein. The upper liner 1312A may be configured in a similar manner, or may be formed as a flat sheet as shown in FIG. 15 to cover the switch device, which will be described later, in a contact manner. The pouch 1902 can be constructed from any suitable material capable of being ripped by a human of average strength. For example, the pouch 1902 can be made of soft tissue paper. In certain embodiments, the pouch is sized to hold a substantial quantity of small particles, such as glitter or confetti; small toys; stickers; press-on tattoos; candy; ribbons; paper with printed messages such as fortunes; bubble wrap; other tangible items; or a combination of items. The pouch 1902 can be made from paper weighing between 5-50 grams per square meter, or another material that breaks easily when the box is opened up or ripped apart. Some embodiments are configured such that the pouch tears apart if the box is opened from the front, opened from the back, or ripped down the middle. The pouch 1902 can be concealed under the liner such that the pouch is prohibited from being exposed even when the box is fully opened. For example, FIG. 19 shows a pouch being attached to the lower liner 1312B covering a third panel (e.g., the third panel 1702 from FIG. 17).

Figure 18:
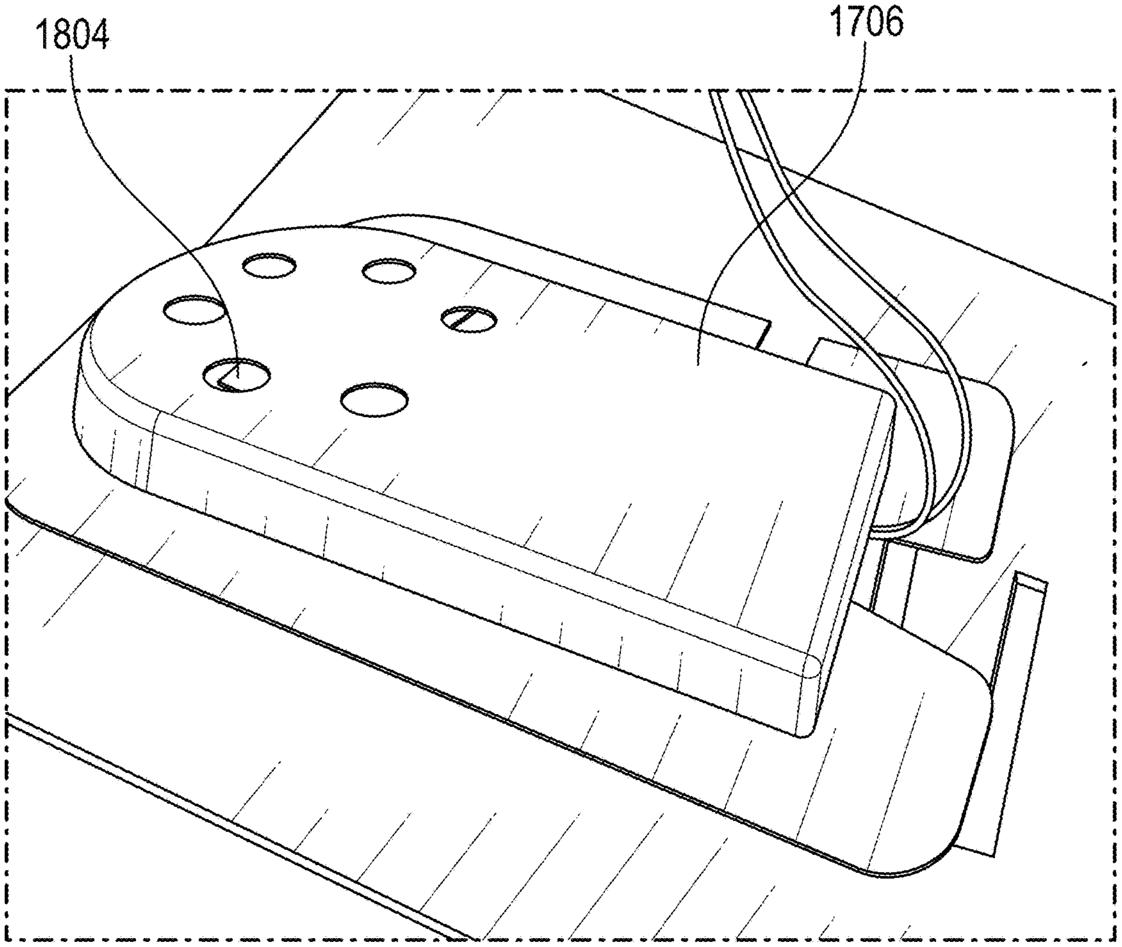
FIG. 18 shows an internal components cover for protecting the internal components of the gift box of FIG. 12.

In some embodiments, the gift box (e.g., the gift box 1200 of FIG. 12) may further include the internal components cover 1706 between the liner and the internal components, or between the pouch 1902 and the third panel 1702 on which internal components are attached, such that the pouch 1902 having particles therein can be sandwiched between the liner 1312 and the internal components cover 1706, as shown in FIG. 17. FIG. 17 illustrates the internal components cover 1706 attached at least partially to the inner surface of the third panel 1702 and covered by the pouch 1902. The internal components cover 1706 can be adhered to the inner surface of the third panel by using, e.g., glue, tape, or the like. Referring to FIG. 18, the internal components cover 1706 may include one or more openings 1804 allowing a pre-recorded sound played by a loudspeaker to pass therethrough. In some embodiments, the pouch 1902 may include an upper side at least partially adhered to the liner 1312 and a lower side partially adhered to the internal components cover 1706. In some embodiments, the internal components cover 1706 has a blister top comprising at least one of a flexible plastic sheet or a polymer cap having a flexural modulus greater than or equal to 0.5 GPa at 72 degrees Fahrenheit. Further, the internal components cover 1706 may have a cover shape with flaps attached therearound similar to the second liner 1312B so as to form a cavity therein for the internal components to be disposed.

When the mode is switched from the temporary mode to the permanent mode by removing the pull-tab 1202 as described above, the controller is configured to operate in the permanent mode to continuously play a pre-recorded sound when the box is opened. In certain embodiments, with reference to FIGS. 14-16, a switch device 1404 is provided on the second panel 1304 to be electrically connected to the internal components on the third panel 1702. The switch device 1404 may be securely attached to the inner surface of the second panel 1304 and covered by the liner 1312A. The switch device 1404 may further extend to the first panel 1302 to be coupled to the inner surface of the first panel 1302.

Figure 16:
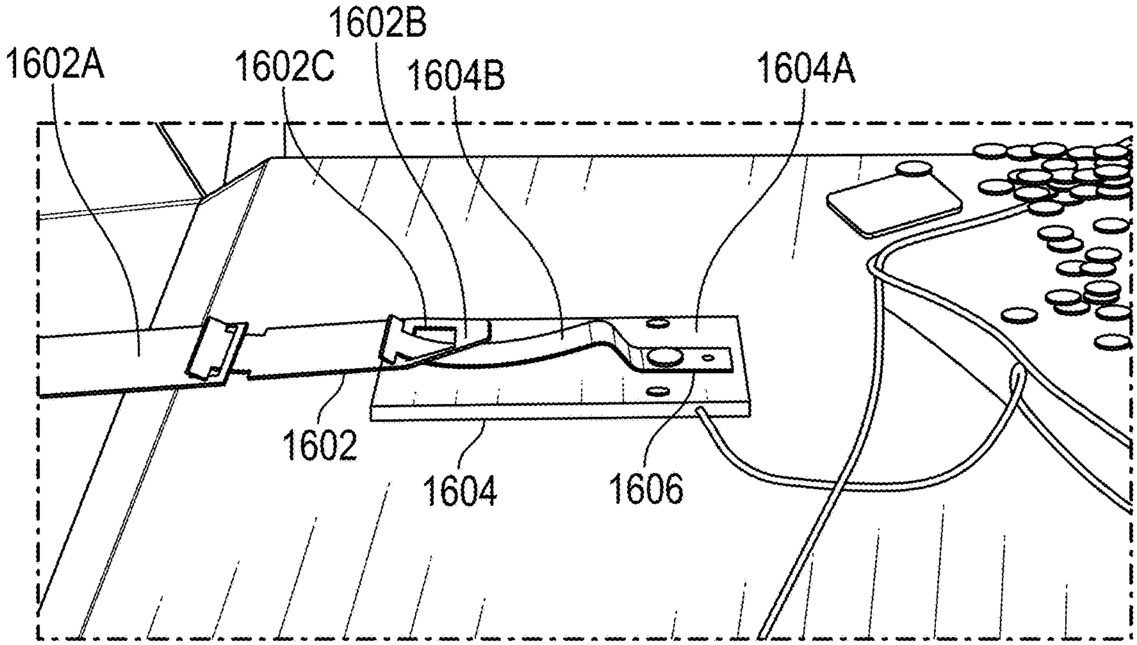
FIG. 16 shows a closed-up view of the switch device for changing gift modes of the embodiment of FIG. 12.

In certain embodiments, referring to FIG. 16, a switch device (e.g., the switch device 1404 in FIG. 14) may include: a sliding portion 1602 having one end 1602A adhered to a first panel (for example, the first panel 1302 in FIG. 13) and another end 1602B extending in an opposite direction toward a second panel (for example, the second panel 1304 in FIG. 13); a fixed portion 1604 having a body 1604A adhered to the second panel and an arm portion 1604B biased to contact the body 1604A and having an opening 1602C through which the arm portion 1604B slides; and electrical coupling 1606. The switch device as configured allows the switch device to be switched between a first position and a second position. When the switch device 1404 is in the first position (i.e., the box is in the completely closed state), the sliding portion 1602 is disposed between the body 1604A and the arm portion 1604B so as to prevent the contact therebetween, and as the first panel and the cover panel 6 are rotated outward to open the box, the another end 1602B of the sliding portion 1602 is pulled away from the fixed portion 1604 through the sliding movement of the another end 1602B through the opening 1602C thereof thus allowing the surface contact between the body 1604A and the arm portion 1604B and switching to the second position. In an embodiment, the electrical coupling 1606 provides power to the switch device. For example, the electrical coupling can include conductive wires coupled to a power source (not shown).

The first position corresponds to the position a switch (e.g., 2006 in FIG. 20) is in when the box is closed. When the controller (e.g., the controller 2004 in FIG. 20) is in the temporary mode (e.g., when the pull-tab 1202 is connected to the mode of operation switch 2006), the switch device 1404 can be moved to or kept in the first position to prevent sound from playing. The switch device can move between the first position and the second position by opening or closing the first panel (e.g., the lid) of a gift box (for example, the gift box 1200 of FIG. 12). When the switch device 1404 is in the second position by opening the box while the box is still in the temporary mode, the switch device can be closed to play sound for a specified period of time or one or more loops of pre-recorded sound. That is, the switch device functions as a two-way switch when a pull-tab is in place so as to selectively play and stop playing the sound. In some embodiments, the sound may stop playing after a certain period of time elapses even after the box is closed, or the sound may immediately stop playing as soon as the box is closed. In some embodiments, the sound may be muted without actually stopping the sound play, or the sound may be reset as the box is closed in the temporary mode such that the same sound or a different sound may be played when the box is opened again in the temporary mode.

Referring to FIGS. 14-19 collectively, when the box is in the permanent mode by removing the pull-tab 1202 by a gift giver, the switch device 1404 functions as a one-way switch such that once the box is opened by, e.g., a gift recipient, the switch device 1404 allows a sound to be continuously played once the lid of the box is opened and the switch device 1404 is moved from the first position to the second position. The sound will continue playing even if the box is closed to switch the switch device 1404 back to the first position. In some embodiments, once the switch device 1404 enters the second state from the first state, the sound will continuously play until the battery is completely discharged or the box and the internal components are destroyed. Therefore, the pull-tab 1202 and the switch device 1404 are connected to the internal components and the controller to independently operate and/or interconnectedly operate together.

As described above, the gift box can include the pouch 1902 for holding items inside of the box that can be revealed when the gift box is opened as noted above. The pouch 1902 can be attached to the box using any suitable technique. For example, at least a periphery of the pouch 1902 can be glued, taped, or otherwise attached to a panel of the box. The pouch 1902 can also be fastened to at least one panel, more specifically, the inner surface of the liner 1312, of the box using matched tabs and slots, hook-and-loop fasteners, rivets, other fasteners, or a combination of any two or more fasteners. Referring to FIG. 19, the pouch 1902 may include a perforated portion 1904B in a closed shape, such as a square, circle, triangle, rectangle, star, or other shape. At least part of the perforated portion 1904B contains perforations. The perforations of the perforated portion 1904B may comprise greater than 30 percent of the space contained within the perforated portion 1904B. In certain embodiments, the perforations can comprise greater than 50 percent of the space of the perforated portion 1904B. The perforations can comprise less than 80 percent of the space of the perforated portion 1904B. A cloth portion 1904A of the pouch 1902 can be disposed inside the perforated portion 1904B. A sub-portion of the perforated portion 1904B that contains perforations can optionally form a closed shape, such as a circle, square, triangle, or rectangle or a shape that is not a closed figure, such as, for example, a U-shape.

The outer surface of the pouch 1902 can be at least partially constructed from any suitable material capable of being easily torn when the box is opened. For example, the pouch 1902 can be at least partially made of paper weighing between 5-75 grams per square meter, paper weighing between 10-20 grams per square meter, or another material that breaks easily. The pouch 1902 may be made of paper that is single ply or multi-ply. The panels of the box are preferably made of a material that is more rigid and durable than the easily torn material of the pouch 1902.

The pouch 1902 can be filled with a payload comprising any number of objects, such as glitter, confetti, small metal or plastic objects, candy, ribbons, small toys, temporary tattoos, papers with printed messages, etc., or any combination of such objects. The pouch 1902 can hold a substantial quantity of such objects in order to increase the surprise experienced by the recipient of the box when the pouch 1902 is torn open and the contents of the pouch 1902 are spilled out. In some embodiments, the pouch 1902 can hold only a small quantity of objects in order to minimize the thickness of the box and to minimize suspicion on the part of the recipient. Accordingly, when a gift recipient applies a force to tear open the box to attempt to stop the sound from playing, the pouch 1902 can be easily ripped to reveal the objects inside.

In some embodiments the gift box may include flaps (see 1502 in FIG. 15) foldably coupled to ends of each panel in a pair, and the pair of flaps connected to each panel may have different dimensions from each other. Each pair of flaps allow the gift box to be completely enclosed when the box is in a closed state by inwardly folded and inserted inside the box or slots formed between inner sides of the box. The flaps can be formed resulting from cutting between sides of the box to ensure the closure of the volumetric body of the box.

Figure 20:
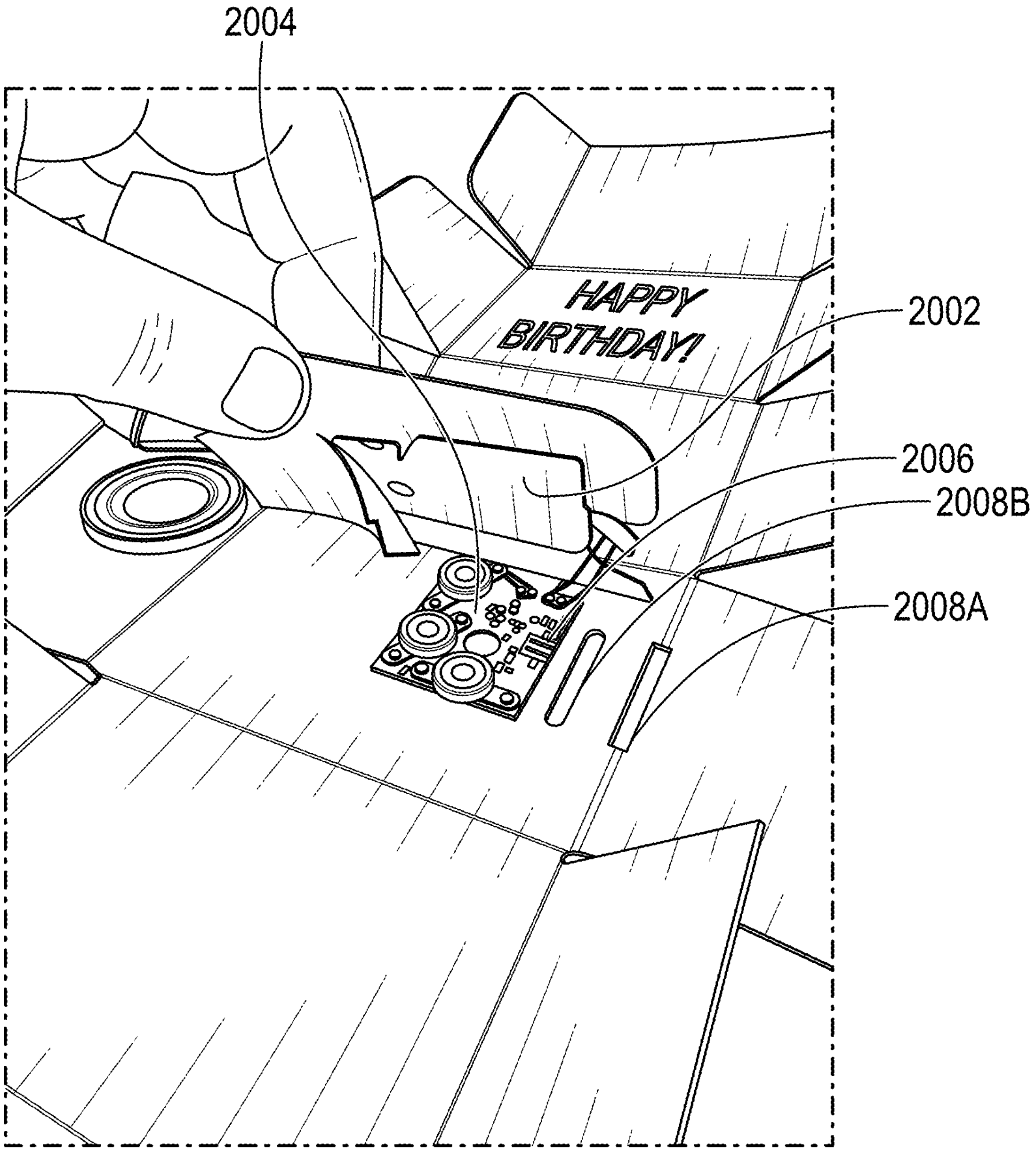
FIG. 20 shows internal components electrically connected with the switch device shown in FIG. 17.

FIG. 20 shows internal components electrically connected with the switch device shown in FIG. 17. The gift box (for example, the gift box 1200 in FIG. 12) can include an internal electronic components region 2002, a controller 2004 that can include one or more features of any controller described in U.S. Pat. No. 10,625,531, filed Jun. 20, 2017, titled "Greeting cards and postcards with concealed feature," the entire contents of which are incorporated by reference herein and made part of this specification. In certain embodiments, the gift enclosure includes a mode of operation switch 2006 (which can be connected, for example, to a pull-tab 1202 as shown in FIG. 12, or to another user interface element that can be operated by user interaction) coupled to the controller 2004 disposed in the internal electronic components region 2002 and configured to change the mode of operation of the box from a state where a pre-recorded sound can be listened to one or more times according to the gift box-giver's preference to a state where the pre-recorded sound cannot be turned off once the box is opened. The mode of operation switch 2006 of the controller 2004 can be coupled to a pull-tab (e.g., the pull-tab 1202 in FIG. 12) that extends through a slot (e.g., the slot 1704 in FIG. 17) formed to extend through a third panel (e.g., the third panel 1702 in FIG. 17) of the box. The slot may be formed at one end of the third panel with a width slightly larger than that of the slot such that the pull-tab can easily slide in and out through the slot. When a user (i.e. the gift box giver) pulls the pull-tab outward through the slot, the operation switch may be activated as the pull-tab decouples from the operation switch. The pull-tab can be removed by a giver of the box before the box is given or mailed to a recipient.

In certain embodiments, the mode of operation switch can only be operated once. In such embodiments, once the mode of operation of the box is changed, the mode of operation switch cannot return the box to its original mode of operation. For instance, FIG. 20 shows one or more slots 2008A-B through which the pull-tab can be inserted into the box in an intertwined manner and pulled out therefrom, and FIG. 17 shows an embodiment where the pull-tab is located inside the slot before being pulled out such that the box is in a temporary mode which will be described hereinafter. A first slot 2008A can be formed at the edge between the third panel and one of the flaps foldably connected at sides of the third panel and a second slot 2008B can be formed adjacent to the first slot 2008A toward the internal components for the pull-tab to be securely inserted through the second slot 2008B and to the controller 2004 via a controller switch interface (e.g., the controller switch interface 17 in FIG. 3). Once the pull-tab is removed from the one or more slots, the mode of operation is changed from the temporary mode to the permanent mode and cannot be changed back to the temporary mode.

Referring to FIG. 20, the internal components of the gift box according to the present disclosure can include a power source that is configured to power electronic components of the box for, e.g., greater than or equal to about 30 minutes, greater than or equal to about 3 hours, greater than or equal to about 4 hours, less than or equal to about 10 hours, and/or less than or equal to about 24 hours. For example, the power source can include three AG10 batteries or another battery configuration selected such that the thickness of the box when folded is less than or equal to a predetermined value, for example, 10 mm, less than or equal to 6 mm, less than or equal to 5 mm, less than or equal to 4 mm, greater than or equal to 3 mm, and/or within a range between any of the preceding values. In some embodiments, the mode of operation switch connected to the pull-tab (for example, the pull-tab 1202 in FIG. 12) may be attached to an electrical insulator that separates leads in a circuit that activates the permanent mode when the circuit is closed by removal of the insulator.

In some embodiments, the internal components may have features that increase the durability of at least some of the internal components. A layer of electrically insulating material, such as, for example, adhesive, sealant, or encapsulant, is disposed adjacent to, on top of, or around the power source. For example, the material can encapsulate the electrodes of the power source, encapsulate a substantial portion of the power source, or encapsulate substantially all of the power source. The insulating material can assist in maintaining the power source to be in contact with the electric leads and in a sealed condition. The insulating material can keep the box functioning even after the box is hit, thrown, and/or smashed. The insulating material layer can have a thickness that is slightly greater than the thickness of the power source. For example, the thickness of the insulating material layer can be greater than or equal to 2 mm, greater than or equal to 3 mm, greater than or equal to 4 mm, less than or equal to 5 mm, less than or equal to 6 mm, and/or within a range between any of the preceding values.

As described above, a substrate may be disposed between the power source and one or more adjacent layers of the box. In some embodiments, the substrate is in a layer that is less than 1 mm thick. The substrate can have an area that is greater than the area of the adjacent power source, greater than or equal to 150% of the area of the adjacent power source, and/or less than 200% of the area of the adjacent power source. An electrically insulating material can be disposed between the substrate and the power source. The substrate can reduce or spread out the force transmitted to the power source during an impact on the box, thus increasing the durability of the box's internal components. In some embodiments, the substrate has top and bottom surfaces that are covered with adhesive and/or adhered to adjoining surfaces above and below the substrate. If the box contains a pouch (for example, the pouch 1902 in FIG. 19), the substrate can adhere to the pouch and rip the pouch open when the inner layer and outer layer of the box are separated from each other.

An insulating material and/or substrate can also be disposed between the user interface mechanism and one or more layers of the box. In certain embodiments, insulating material may be applied to all soldering points present in the internal components of the box. Wires connecting to the speaker are soldered. The soldering points on the controller that lead to the speaker can be encapsulated with insulating material, such as, for example, adhesive.

In some embodiments, a protective enclosure or layer is disposed around or adjacent to at least the controller and the speaker. The protective enclosure or layer can be constructed from a material that resists tearing, thus making it more difficult for the user to stress or break the wires and connections between the controller and the speaker by tearing the box.

The internal components include a controller configured to play a pre-recorded sound at intervals after the mode of operation switch is activated, that is, the mode is changed from the temporary mode to the permanent mode. For example, the controller can be configured to play a 2-3 second looping chirp every 90 seconds until the battery dies. In certain embodiments, there is a delay between activating the mode of operation switch and initiating playing the pre-recorded sound at intervals. For example, the controller may wait greater than or equal to 30 seconds, 1 minute, 2 minutes, 5 minutes, less than or equal to 10 minutes, less than or equal to 1 hour, a user-selected amount of time, or a period of time between any of the preceding values before initiating playing the pre-recorded sound at intervals. This provides an opportunity for a user of the box to leave the area after the box is attached to the bottom of a table, the bottom of a chair, etc., thus providing the user an opportunity to escape and increasing the practical joke value of the box. In certain embodiments, the box is sized to be difficult to tear and/or destroy.

Figure 21:
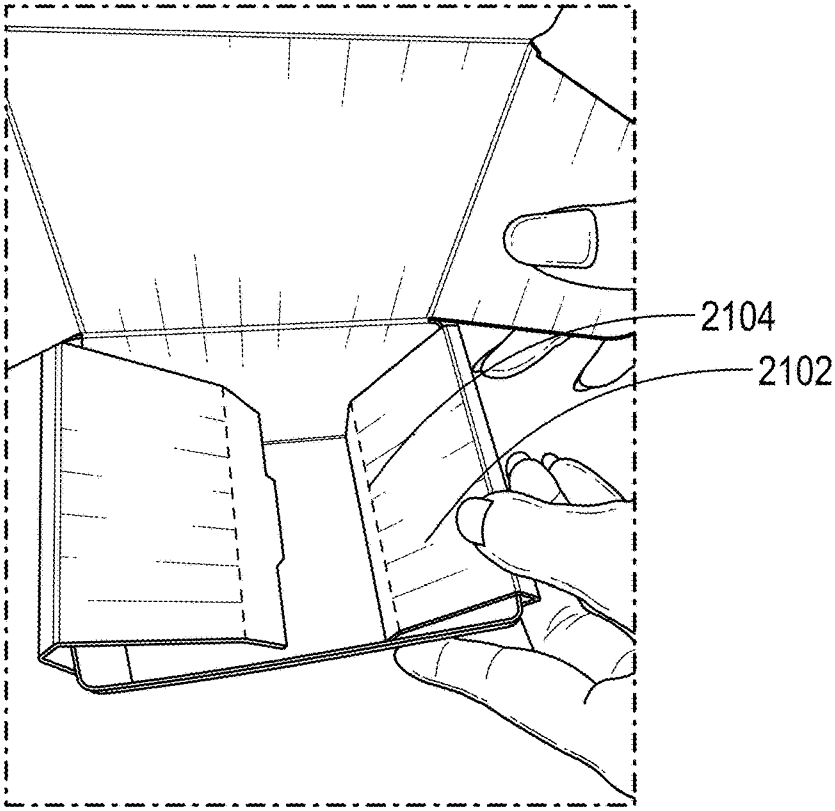
FIG. 21 shows a perspective view of a gift box with folded side flaps.

FIG. 21 shows a perspective view of a gift box with folded side flaps. As shown in FIG. 21, the internal side closure flaps 2102 of the gift box 1200 can include fold lines 2104 that simplify the assembly of the box by making it easier to insert the internal side closure flaps 2102 into the slots 2008B on the bottom of the gift box 1200.

Figure 22:
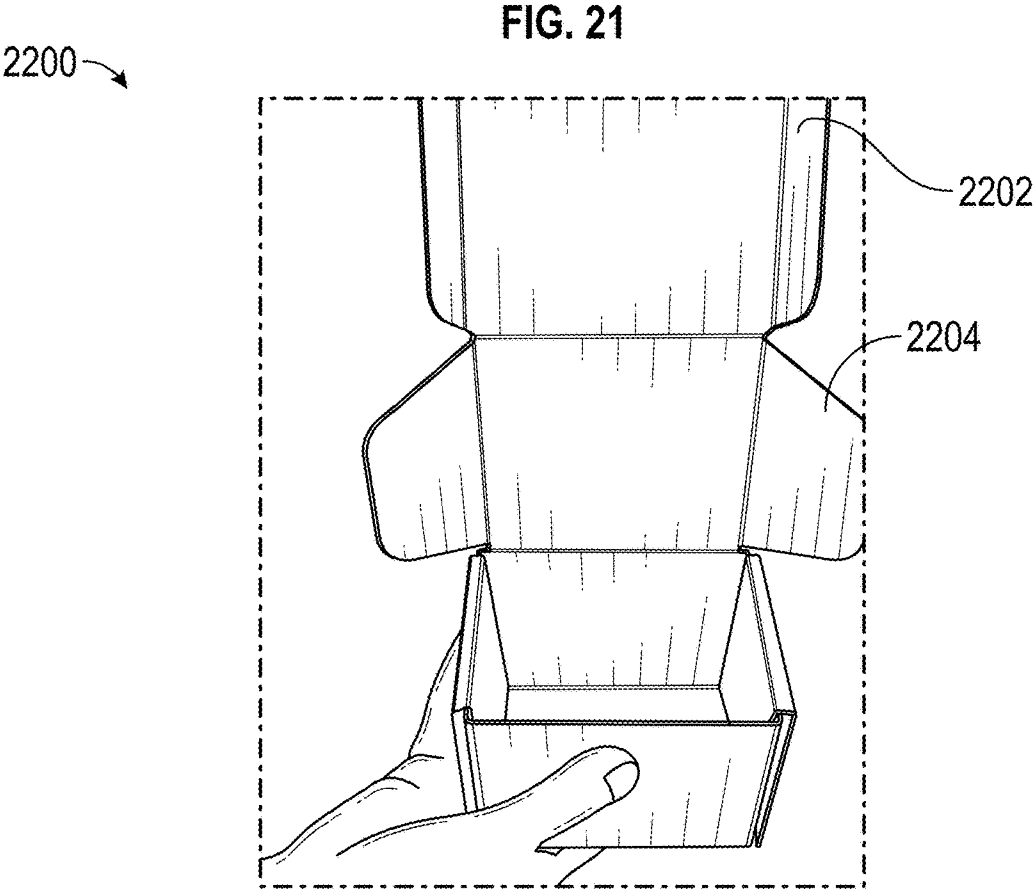
FIG. 22 shows a perspective view of a gift box with closing flaps.

FIG. 22 shows a perspective view of a gift box with closing flaps. As shown in FIG. 22, the external front closure flaps 2202 of a gift box (e.g., the gift box 1200 in FIG. 12) can be smaller than the external top closure flaps 2204. For example, the width of the external front closure flaps 2202 can be half the width or less than half the width of the external top closure flaps 2204. The smaller dimensions of the external front closure flaps 2202 can make the gift box easier to open.

Figure 23:
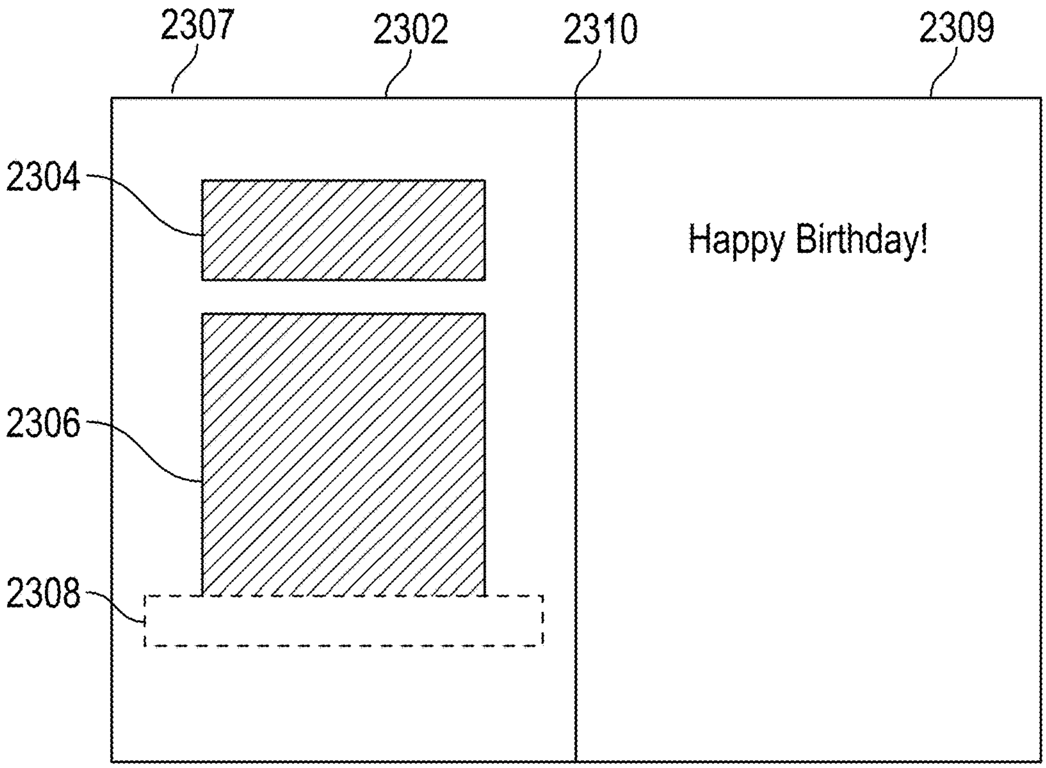
FIG. 23 shows a schematic view of an unfolded greeting card embodiment with multiple pouches.

FIG. 23 shows a schematic view of an unfolded greeting card 2302 embodiment with multiple pouches. The greeting card 2302 can include a first pouch 2304, a second pouch 2306, a separable coupling 2308, and/or a fold line 2310. The greeting card 2302 can include a first panel 2307 and/or a second panel 2309. The fold line 2310 may be disposed between the first and second panels 2307, 2309. In certain embodiments, the greeting card 2302 is configured to hold a payload. For example, the payload can include a substantial quantity of small particles (such as, for example, glitter or confetti) without permitting the small particles to fall out of the card. The greeting card 2302 can include internal components positioned within a first pouch 2304 of the greeting card 2302. The first pouch 2304 can be attached to the card using any suitable technique. For example, the first pouch 2304 can be glued to a layer of the card around at least a portion of the periphery of the second pouch 2306. The first pouch 2304 can be constructed from any suitable material capable of being ripped by a human of average strength. For example, the first pouch 2304 can be made of soft tissue paper. The first pouch 2304 can be sealed using a sealing material to prevent fluid from entering. The sealing material can include acetate, tape, glue, and/or any other form of sealing material. In certain embodiments, the first pouch 2304 is sized to hold internal components. In certain embodiments, the first pouch 2304 and/or the second pouch 2306 can be positioned beneath a panel of the greeting card 2302. For example, the greeting card 2302 can include the panel to cover (e.g., conceal, obscure) the first pouch 2304 and the second pouch 2306 such that a recipient would be unable to view or clearly view the first pouch 2304 and the second pouch 2306. In another embodiment, the separable coupling 2308 can be coupled to the panel. In this manner, the recipient can separate the separable coupling 2308 without noticing the second pouch 2306 such that the separation reveals the payload.

In some embodiments, the greeting card 2302 includes a second pouch 2306 for holding the payload and/or items inside of the card that can be revealed when the card is ripped or otherwise destroyed. The second pouch 2306 can be attached to the card using any suitable technique. For example, the second pouch 2306 can be glued to a layer of the card around at least a portion of the periphery of the second pouch 2306. The second pouch 2306 can be constructed from any suitable material capable of being ripped by a human of average strength. For example, the second pouch 2306 can be made of soft tissue paper. The second pouch 2306 can be sealed using a sealing material to prevent fluid from entering. The sealing material can include acetate, tape, glue, or any other form of sealing material. In certain embodiments, the second pouch 2306 is sized to hold a payload. In some embodiments, the payload can include a substantial quantity small particles, such as glitter or confetti; small toys; stickers; press-on tattoos; candy; ribbons; paper with printed messages such as fortunes; bubble wrap; other tangible items; or a combination of items. The second pouch 2306 can be made from paper weighing between 5-50 grams per square meter, paper weighing between 10-20 grams per square meter (g/m^2 or gsm), or another material that breaks easily when the card is opened up or ripped apart. Some embodiments are configured such that the second pouch 2306 tears apart if the card is opened from the front, opened from the back, or ripped down the middle. The second pouch 2306 can be concealed such that the second pouch 2306 cannot be seen by looking at the exterior of the card. In some embodiments, the greeting card 2302 includes a separable coupling 2308 along a surface of the second pouch 2306. The separable coupling 2308 can include a perforated perimeter such that the separable coupling 2308 can become at least partially separated from the second pouch 2306 to reveal (e.g., allow access to) the payload. For example, a user can pull the separable coupling 2308 to reveal the payload.

The greeting card 2302 can include a fold line 2310 that permits the first pouch 2304 and the second pouch 2306 to be hidden from view when the card is folded. One or more fasteners can be used to connect the inner layer of the card to the outer layer of the card when the card is folded at the fold line 2310. The greeting card 2302 can have any dimensions suitable for a greeting card, such as, for example, 5×7 inches. The card can be made of card stock, paper, another material suitable for printed messages or indicia, or a combination of materials.

Figure 24:
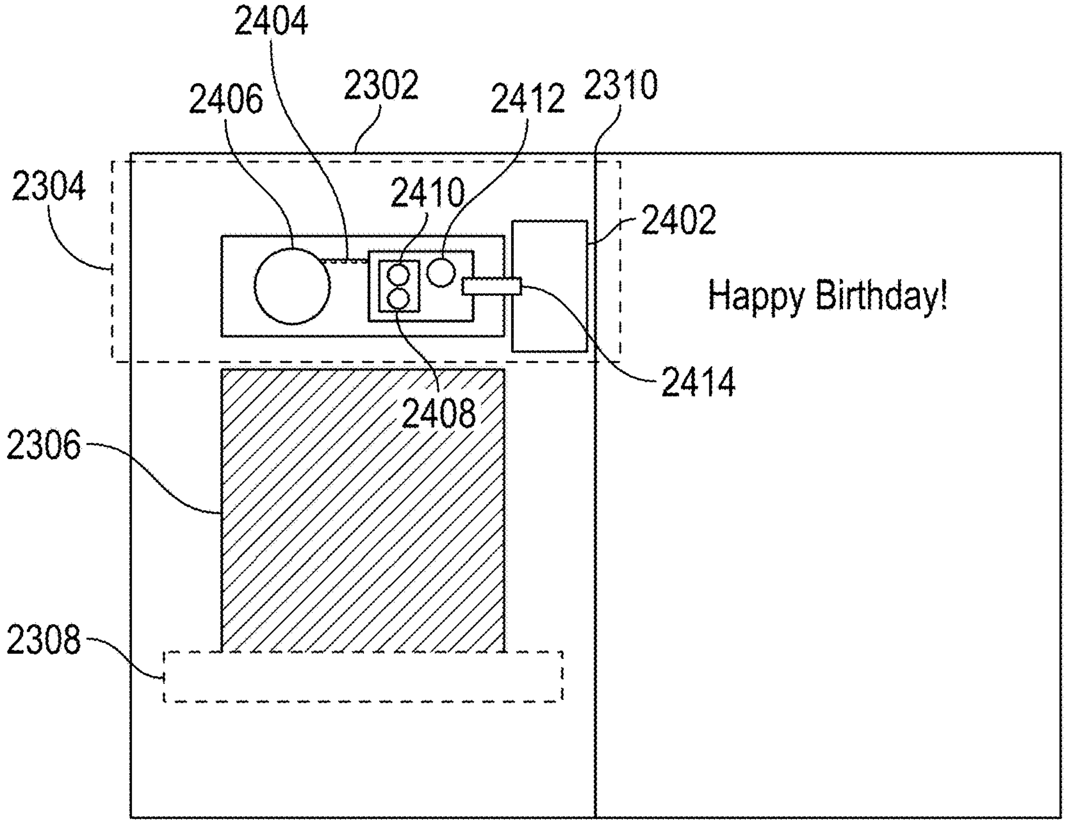
FIG. 24 shows a schematic view of internal components of the embodiment shown in FIG. 23.

FIG. 24 shows a schematic view of internal components of the embodiment shown in FIG. 23. The greeting card 2302 can include a first pouch 2304, a second pouch 2306, a separable coupling 2308, and a fold line 2310. The greeting card 2302 can include internal components positioned within a first pouch 2304 of the greeting card 2302. In some embodiments, the components include a mode of operation switch 2402, wires 2404, a speaker 2406, a controller 2408, batteries 2410, a button 2412, an electrical insulator 2414, and other components that can fail when exposed to impacts, drops, kicks, and other forces. The card can include features that protect the wires 2404, batteries 2410, connections, and other sensitive circuit elements. For example, padding can be placed between sensitive circuit elements (e.g., the circuit elements 2404, 2406, and 2412) and at least one of the card layers so that the card can withstand significant impact forces without component failure. In certain embodiments, the greeting card 2302 is configured to hold a payload. For example, the payload can include a substantial quantity of small particles (such as, for example, glitter or confetti) without permitting the small particles to fall out of the card. In some embodiments, the controller 2408 can include one or more features of any controller described herein or in U.S. Pat. No. 10,625,531, filed Jun. 20, 2017, titled "Greeting cards and postcards with concealed feature," the entire contents of which are incorporated by reference herein and made part of this specification. In certain embodiments, the first pouch 2304 and the second pouch 2306 can be positioned beneath a panel of the greeting card 2302. For example, the greeting card 2302 can include the panel to cover the first pouch 2304 and the second pouch 2306 such that a recipient would be unable to view the first pouch 2304 and the second pouch 2306. In another embodiment, the separable coupling 2308 can be coupled to the panel. In this manner, the recipient can separate the separable coupling 2308 without noticing the second pouch 2306 such that the separation reveals the payload.

In some embodiments, the greeting card 2302 includes a second pouch 2306 for holding the payload and/or items inside of the card that can be revealed (e.g., provided access to) when the card is ripped or otherwise destroyed. The second pouch 2306 can be attached to the card using any suitable technique. For example, the second pouch 2306 can be glued to a layer of the card around at least a portion of the periphery of the second pouch 2306. The second pouch 2306 can be constructed from any suitable material capable of being ripped by a human of average strength. For example, the second pouch 2306 can be made of soft tissue paper. In certain embodiments, the second pouch 2306 is sized to hold a payload. In some embodiments, the payload can include a substantial quantity small particles, such as glitter or confetti; small toys; stickers; press-on tattoos; candy; ribbons; paper with printed messages such as fortunes; bubble wrap; other tangible items; or a combination of items. The second pouch 2306 can be made from paper weighing between 5-50 grams per square meter, paper weighing between 10-20 grams per square meter (g/m^2 or gsm), or another material that breaks easily when the card is opened up or ripped apart. Some embodiments are configured such that the second pouch 2306 tears apart if the card is opened from the front, opened from the back, or ripped down the middle. The second pouch 2306 can be concealed such that the second pouch 2306 cannot be seen by looking at the exterior of the card. In some embodiments, the greeting card 2302 includes a separable coupling 2308 along a surface of the second pouch 2306. The separable coupling 2308 can be configured to reveal the payload.

In some embodiments, the first pouch 2304 can include the batteries 2410 that are configured to power the electronic components of the card for greater than or equal to about 3 hours, greater than or equal to about 4 hours, less than or equal to about 10 hours, and/or less than or equal to about 24 hours. For example, the batteries 2410 can include three AG10 batteries or another battery configuration selected such that the thickness of the card when folded is less than or equal to 10 mm, less than or equal to 6 mm, less than or equal to 5 mm, less than or equal to 4 mm, greater than or equal to 3 mm, and/or within a range between any of the preceding values. The greeting card 2302 can include a fold line 2310 that permits the first pouch 2304 and the second pouch 2306 to be hidden from view when the card is folded. One or more fasteners can be used to connect the inner layer of the card to the outer layer of the card when the card is folded at the fold line 2310. The greeting card 2302 can have any dimensions suitable for a greeting card, such as, for example, 5×7 inches. The card can be made of card stock, paper, another material suitable for printed messages or indicia, or a combination of materials. In some embodiments, the mode of operation switch 2402 (which is numbered as tab 8 in FIG. 2 and as tab 2 in FIG. 1) is attached to an electrical insulator 2414 separates leads in a circuit that activates the permanent mode when the circuit is closed by removal of the electrical insulator 2414.

Figure 25C:
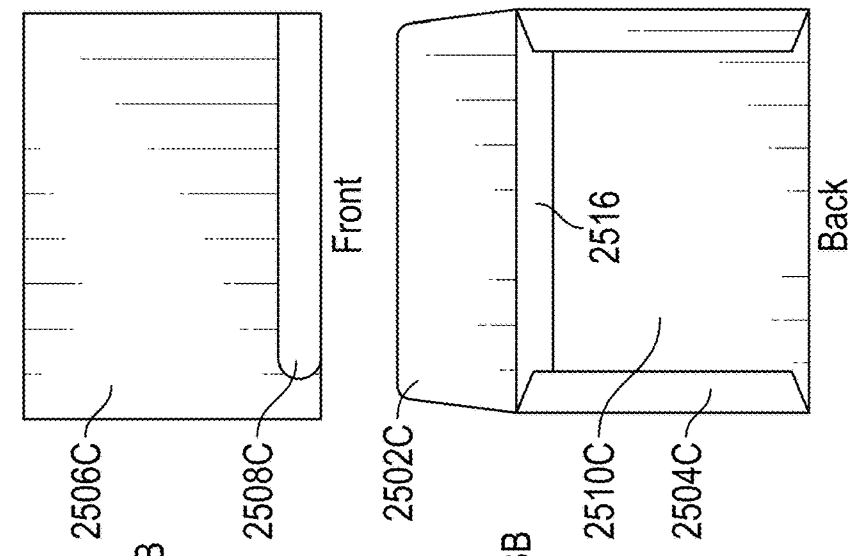
FIGS. 25A-C show several schematic views of an envelope with closing flaps, according to a first embodiment.
Figure 25B:
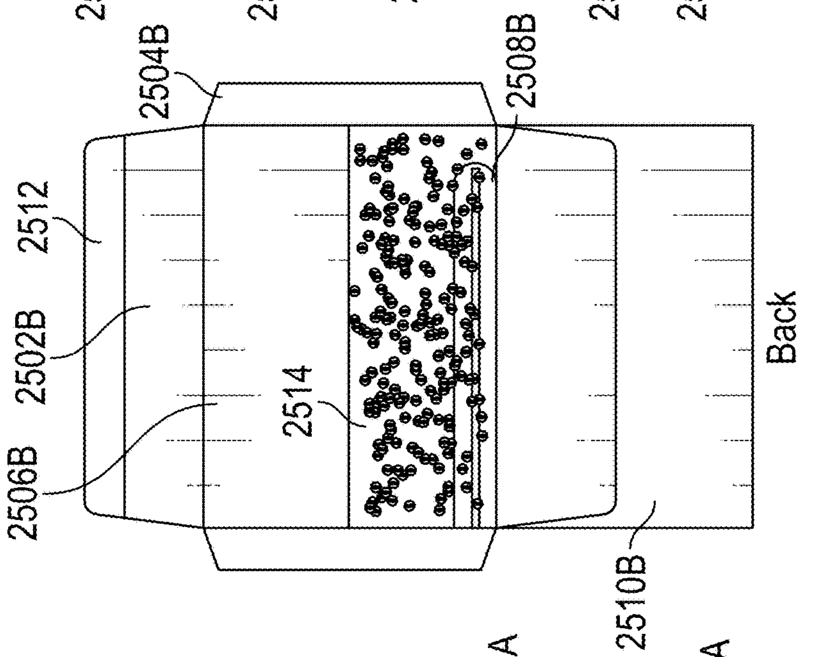
Figure 25A:
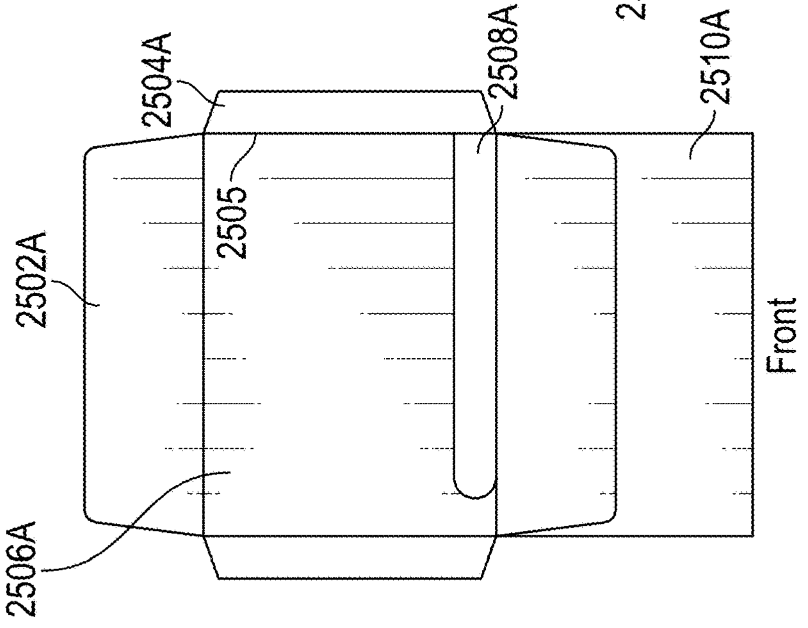

FIGS. 25A-C show several schematic views of an envelope with closing flaps, according to a first embodiment. The envelope can include a top flap 2502A-C, a side flap 2504A-C, at least one fold line 2505, an upper central region 2506A-C (e.g., a first panel), a separable coupling 2508A-C, and a lower central region 2510A-C (e.g., a second panel). Referring to FIG. 25B, the envelope can further include an adhesive member 2512 along the top flap 2502B and a pouch 2514. Referring to FIG. 25C, the envelope can further include an opening 2516, which can be configured to insert an item (such as a greeting card). In some embodiments, the elements of the envelope can be folded to result in a final form of the envelope (e.g., illustrated in FIG. 25C). The elements can be configured to adhere to one another using an adhesive material. For example, the adhesive material can include acetate, glue, tape, or any other adhesive material. In some embodiments, the separable coupling 2508A-C can be configured to reveal a payload in response to a separation of the separable coupling 2508A-C. The separable coupling 2508A-C can extend along a surface of the pouch 2514. In some embodiments, the separable coupling 2508A-C can extend only along a portion of the surface of the pouch 2514. The separable coupling 2508A-C can be accessible to a user when the envelope is in the folded configuration. For example, the separable coupling 2508A-C may comprise a portion of the upper central region 2506A-C and/or a portion of the pouch 2514. Thus, in some embodiments, the separable coupling 2604A-C can allow a user to expose the hidden payload directly from an outside of the envelope (e.g., the upper central region 2506A-C, such as a lower portion thereof). For example, in some embodiments, the separable coupling 2508A-C may be near or adjacent to the fold line between the upper central region 2506A-C and the lower central region 2510A-C (e.g., near a bottom of the envelope in the folded configuration).

Figure 26C:
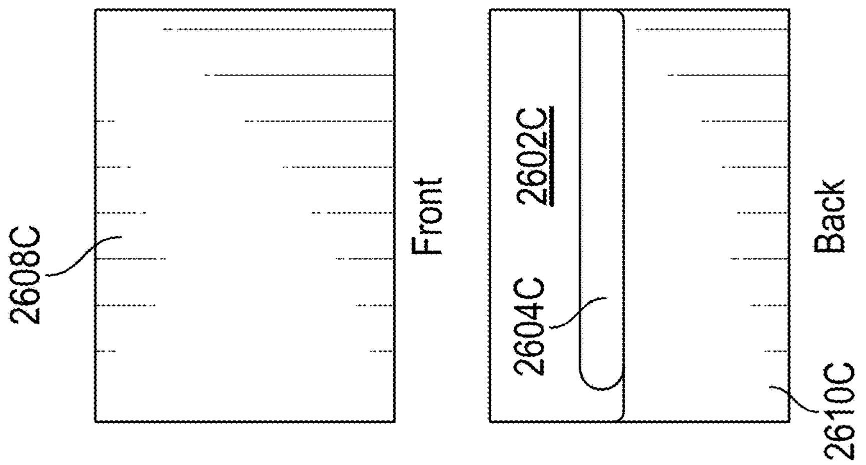
FIGS. 26A-C show several schematic views of an envelope with closing flaps, according to a second embodiment.
Figure 26B:
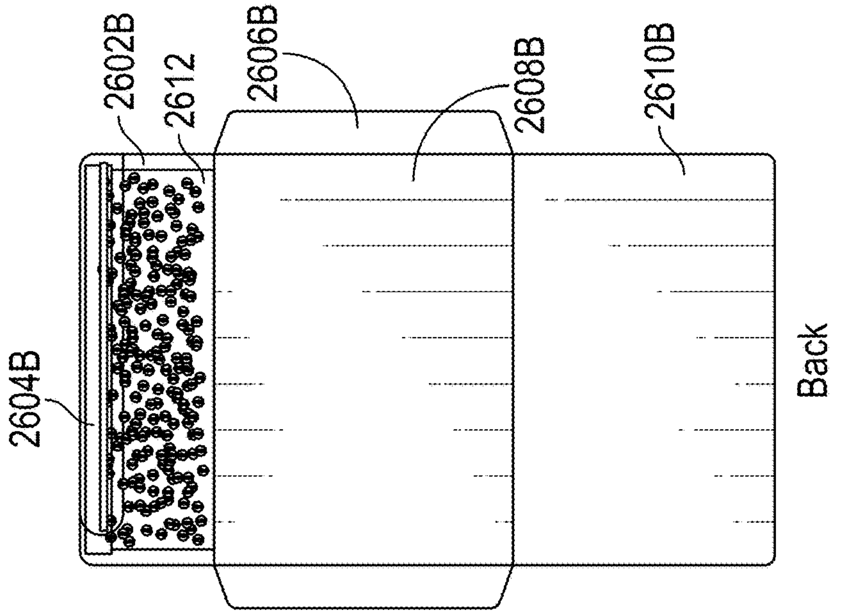
Figure 26A:
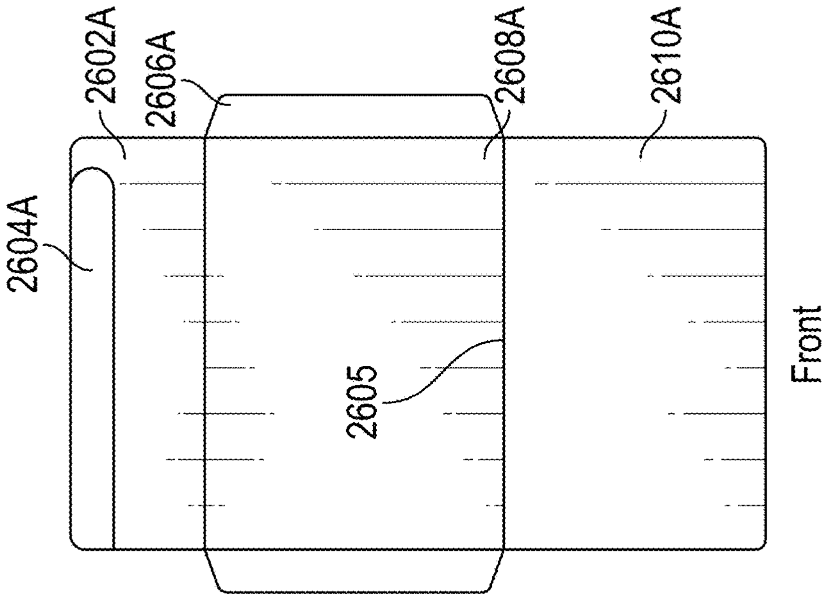

FIGS. 26A-C show several schematic views of an envelope with closing flaps, according to a second embodiment. The envelope can include a top flap 2602A-C, a separable coupling 2604A-C, at least one fold line 2605, a side flap 2606A-C, an upper central region 2608A-C, and a lower central region 2610A-C. In some embodiments, the side flap 2606A can include an adhesive. Referring to FIG. 26B, the envelope can further include a pouch 2612. Referring to FIG. 26C, the elements of the envelope can be folded to result in a final form of the envelope. The elements can be configured to adhere to one another using an adhesive material. For example, the adhesive material can include acetate, glue, tape, or any other adhesive material. In some embodiments, the separable coupling 2604A-C can be configured to reveal a payload in response to a separation of the separable coupling 2604A-C. The separable coupling 2604A-C can extend along a surface of the pouch 2612. In some embodiments, the separable coupling 2604A-C can extend only along a portion of the surface of the pouch 2612. The a separable coupling 2604A-C can be accessible to a user in the folded configuration. For example, the separable coupling 2604A-C may comprise a portion of the top flap 2602A-C and/or a portion of the pouch 2612. Thus, in some embodiments, the separable coupling 2604A-C can allow a user to expose the hidden payload directly from an outside of the envelope (e.g., the top flap 2602A-C).

In a first embodiment, the present disclosure provides an apparatus configured to reveal a payload in response to a separation of a separable coupling and continuously play a pre-recorded sound through a speaker until a battery is discharged, the apparatus comprising: a first panel comprising a first inner surface; a second panel comprising a second inner surface; a first pouch disposed along the first inner surface, the first pouch comprising a separable coupling along a surface of the first pouch, the separable coupling configured to reveal a payload in response to a separation of the separable coupling; a second pouch comprising: the speaker; a controller coupled to the speaker, wherein the controller implements a temporary mode of operation and a permanent mode of operation, and wherein, in the temporary mode of operation, the controller is configured to play the pre-recorded sound through the speaker for less than 10 minutes; and the battery configured to provide electric power to the controller, wherein, in the permanent mode of operation, the controller is configured to continuously play the pre-recorded sound through the speaker until the battery is discharged; and a mode of operation switch operatively coupled to the controller, wherein, in response to a user operating the mode of operation switch, the controller is configured to switch from the temporary mode of operation to the permanent mode of operation, wherein, after the user operates the mode of operation switch, the mode of operation switch cannot be switched from the permanent mode of operation to the temporary mode of operation, and wherein the pre-recorded sound cannot be turned off via user operation of the mode of operation switch.

In a second embodiment, any of the configurations herein including at least one of the first or second pouches comprises a sealing material configured to prevent fluid entering therein.

In a third embodiment, any of the configurations herein including the sealing material comprises acetate.

In a fourth embodiment, any of the configurations herein including the mode of operation switch is configured to be decoupled from the controller.

In a fifth embodiment, any of the configurations herein including the payload comprises glitter, stickers, or prizes.

In a sixth embodiment, any of the configurations herein including the first pouch is adhered to at least one of the first inner surface or the second inner surface of the apparatus.

In a seventh embodiment, any of the configurations herein including the first panel and the second panel are at least partially made of paper or cardboard.

In an eighth embodiment, any of the configurations herein including the mode of operation switch can only be operated once.

In a ninth embodiment, any of the configurations herein including the mode of operation switch comprises a tab accessible and removable by a sender of the apparatus.

In a tenth embodiment, any of the configurations herein including the tab is operatively coupled to a circuit that activates the permanent mode of operation when the circuit is closed by removal of the tab.

In a eleventh embodiment, any of the configurations herein including the tab comprises an electrical insulator that separates leads in the circuit.

In a twelfth embodiment, any of the configurations herein including the tab is configured to be removed in response to the sender of the apparatus pulling the tab outward.

In a thirteenth embodiment, any of the configurations herein including the mode of operation switch is configured to protrude through a slit or opening of the apparatus.

In a fourteenth embodiment, any of the configurations herein including at least one of the first and second panels is made of card stock having a paper weight of 300-450 grams per square meter.

In a fifteenth embodiment, any of the configurations herein further comprising a fold line disposed between the first panel and the second panel, and wherein the second pouch is hidden from view when the apparatus is folded along the fold line.

In a sixteenth embodiment, the present disclosure provides an apparatus configured to reveal a hidden payload in response to the apparatus being ripped or destroyed, the apparatus comprising: a first panel comprising a first inner surface; a second panel comprising a second inner surface; a fold line disposed between the first panel and the second panel; an internal components region disposed between the first inner surface of the first panel and the second inner surface of the second panel, wherein the internal components region of the apparatus contains a plurality of internal components comprising: a speaker; a controller connected to the speaker, wherein the controller implements a temporary mode of operation and a permanent mode of operation, and wherein, in the temporary mode of operation, the controller is configured to play a pre-recorded sound through the speaker when the apparatus is opened; and a battery configured to provide electric power to the controller, wherein, in the permanent mode of operation, the controller is configured to intermittently play the pre-recorded sound in a loop until the battery is discharged; and a mode of operation switch operatively coupled to the controller, wherein, in response to a user operating the mode of operation switch, the controller is configured to switch from the temporary mode of operation to the permanent mode of operation, wherein, after the user operates the mode of operation switch, the mode of operation switch cannot be switched from the permanent mode of operation to the temporary mode of operation, and wherein the pre-recorded sound cannot be turned off via user operation of the mode of operation switch; and a pouch comprising a payload configured to be revealed in response to the apparatus being ripped or otherwise destroyed.

In a seventeenth embodiment, any of the configurations herein including the internal components further comprise a button to control the pre-recorded sound.

In an eighteenth embodiment, any of the configurations herein including the button is configured to pause the pre-recorded sound temporarily.

In a nineteenth embodiment, any of the configurations herein including the button is configured to pause the pre-recorded sound for 30 seconds, 1 minute, or a random duration.

In a twentieth embodiment, any of the configurations herein including the controller is configured to play the pre-recorded sound until the battery dies when the button is inactive.

In a twenty-first embodiment, any of the configurations herein including the pre-recorded sound increases in volume over time during play of the pre-recorded sound.

In a twenty-second embodiment, any of the configurations herein including the controller is configured to play one loop of the pre-recorded sound through the speaker when the apparatus is opened.

In a twenty-third embodiment, any of the configurations herein including the controller is configured to play the pre-recorded sound at a random time.

In a twenty-fourth embodiment, any of the configurations herein including the controller is configured to play the pre-recorded sound until the battery dies when the button is inactive.

In a twenty-fifth embodiment, any of the configurations herein including the pouch is adhered to at least one of the first inner surface or the second inner surface of the apparatus.

In a twenty-sixth embodiment, any of the configurations herein including the fold line permits the internal components of the apparatus to be hidden from view when the apparatus is folded along the fold line.

In a twenty-seventh embodiment, any of the configurations herein including the mode of operation switch comprises a tab configured to be removed by a sender of the apparatus, wherein the tab is configured to be removed in response to the sender of the apparatus pulling the tab outward.

In a twenty-eighth embodiment, any of the configurations herein including the tab is attached to an electrical insulator that separates leads in the circuit.

In a twenty-ninth embodiment, any of the configurations herein further comprising: a third panel; and a second fold line disposed between the second panel and the third panel, wherein the apparatus is disposed in an open configuration when the second panel and the third panel are not folded along the second fold line; wherein the controller is configured to play the pre-recorded sound when the apparatus is opened into the open configuration.

In a thirtieth embodiment, the present disclosure provides an enclosure configured to reveal a hidden payload in response to a separation of a separable coupling, the enclosure comprising: a first panel comprising a first inner surface and a plurality of flaps; a second panel comprising a second inner surface; a fold line disposed between the first panel and the second panel; a pouch coupled to the first panel, the pouch comprising the separable coupling along a surface of the pouch, the separable coupling configured to reveal a payload in response to a separation of the separable coupling; wherein the flaps are configured to wrap around the second panel when the first panel and the second panel are folded along the fold line in a folded configuration.

In a thirty-first embodiment, any of the configurations herein including the flaps are configured to wrap around and adhere to the second panel using an adhesive material when the first panel and the second panel are in the folded configuration.

In a thirty-second embodiment, any of the configurations herein including the separable coupling extends only along a portion of the surface of the pouch.

In a thirty-third embodiment, any of the configurations herein including the pouch is disposed on the first panel along the first inner surface.

In a thirty-fourth embodiment, any of the configurations herein including the pouch is disposed on the first panel along one of the plurality of flaps.

In a thirty-fifth embodiment, an apparatus configured to contain a gift, the apparatus comprising: a first panel comprising a first inner surface; a second panel comprising a second inner surface, wherein the first panel is rotationally coupled to a first edge of the second panel; a switch coupled to the first and second inner surfaces, wherein rotating the first panel causes the switch to move between a first state and a second state; a third panel comprising a third inner surface, wherein the third panel is coupled to a second edge of the second panel; a liner covering the second and third inner surfaces; and a plurality of internal components positioned between the liner and the third inner surface, wherein: the plurality of internal components comprises a speaker, a battery, and a controller connected to the speaker, the switch, and the battery, the controller is operable in a safe mode of operation and a recipient mode of operation, the battery is configured to provide electric power to the controller, when the controller is in the safe mode of operation, the controller is configured to start playing a pre-recorded sound through the speaker when the switch moves from the first state to the second state and to stop playing the pre-recorded sound when the switch moves from the second state to the first state, and when the controller is in the recipient mode of operation, the controller is configured to start playing the pre-recorded sound through the speaker when the switch moves from the first state to the second state and to continue playing the pre-recorded sound until the battery is discharged.

In a thirty-sixth embodiment, the apparatus of embodiment 35, further comprising a mode-of-operation switch coupled to the controller, wherein the controller is configured to switch from the safe mode of operation to the recipient mode of operation in response to a user activating the mode-of-operation switch.

In a thirty-seventh embodiment, the apparatus of embodiment 36, wherein: the third panel comprises a slot extending through the third panel, the mode-of-operation switch is coupled to a pull-tab that extends through the slot, and the user activates the mode-of-operation switch by pulling the pull-tab through the slot until the pull-tab decouples from the mode-of-operation switch.

In a thirty-eighth embodiment, the apparatus of any embodiment, further comprising an internal components cover interposed between the liner and the internal components.

In a thirty-ninth embodiment, the apparatus of embodiment 38, wherein the internal components cover comprises rigid plastic.

In a fortieth embodiment, the apparatus of embodiment 38, wherein the internal components cover is at least partially adhered to the third inner surface.

In a forty-first embodiment, the apparatus of embodiment 38 further comprising a pouch filled with glitter positioned between the liner and the internal components cover.

In a forty-second embodiment, the apparatus of embodiment 41, wherein: the pouch comprises a top sheet attached to a bottom sheet, the glitter is contained between the top and bottom sheets, the top sheet is at least partially adhered to the liner, and the bottom sheet is at least partially adhered to the internal components cover.

In a forty-third embodiment, the apparatus of any embodiment, wherein the internal components cover comprises a plurality of openings through which the pre-recorded sound played by the speaker can pass.

In a forty-fourth embodiment, a gift box comprising: a lid, a plurality of sidewalls, and a bottom panel, wherein the lid is coupled to a first sidewall of the plurality of sidewalls such that the lid is moveable between a closed position and an open position; a cavity defined by the lid, the plurality of sidewalls, and the bottom and configured to receive a gift; a switch coupled to the first sidewall and the lid, wherein the switch is in a first state when the lid is in the closed position and the switch is in a second state when the lid is in the open position; a plurality of electronic components attached to the bottom panel, wherein the plurality of electronic components comprises a speaker, a battery, and a controller electrically coupled to the speaker, battery, and the switch; and a protective cover attached to the bottom panel and at least partially covering the plurality of electronic components, wherein: the controller is operable in a sender mode and a recipient mode, when the controller is operating in the sender mode, the controller is configured to play a pre-recorded sound using the speaker when the switch is in the second state but to not play any sound when the switch is in the first state, and when the controller is operating in the recipient mode, the controller is configured to play the pre-recorded sound using the speaker when the switch is in the first state and to continue playing the pre-recorded sound if the switch moves from the first state to the second state.

In a forty-fifth embodiment, the gift box of embodiment 44 wherein the lid is coupled to the first sidewall along an edge and wherein the lid moves between the closed position and the open position by rotating at least 10° about the edge.

In a forty-sixth embodiment, the gift box of any embodiment further comprising a liner disposed within the cavity and at least partially obscuring the protective cover such that the protective cover is interposed between the liner and the bottom.

In a forty-seventh embodiment, the gift box of embodiment 46 further comprising a pouch positioned between the liner and the plastic cover, wherein the pouch comprises a payload configured to be revealed in response to the liner being ripped or removed from the cavity.

In a forty-eighth embodiment, the gift box of any embodiment wherein the pouch is adhered to the liner and to the plastic cover.

In a forty-ninth embodiment, the gift box of any embodiment wherein the switch comprises: a sliding portion having opposing first and second ends, wherein the first end is adhered to the lid; and a fixed portion having a first arm adhered to the first sidewall and a second arm biased to contact the first arm, wherein: when the switch is in the first state, the second end of the sliding portion is positioned between the first and second arms to prevent the first and second arms from touching, and when the switch is in the is in the second state, the first arm is in contact with the second arm.

In a fiftieth embodiment, the gift box of embodiment 49 wherein: the first and second arms are electrically connected to the controller to form a circuit, when the switch is in the first state, the circuit is open, and when the switch is in the second state, the circuit is closed.

In a fifty-first embodiment, the gift box of embodiment 49 wherein moving the lid between the closed position and the open position causes the second end of the sliding portion to slide between the first and second arms such that, when the lid is in the open position, the second end does not prevent the second arm from contacting the first arm.

In a fifty-second embodiment, the apparatus configured to contain a gift, the apparatus comprising: a panel; a switch operatively coupled to the panel and configured to move between a first state and a second state in response to the panel moving; an internal components region disposed within the apparatus and containing a plurality of internal components, the plurality of internal components comprising: a speaker; a battery; and a controller connected to the speaker, the battery, and the switch, wherein the battery is configured to provide electric power to the controller and wherein the controller is operable in a sender mode and a recipient mode; and a protective cover disposed over the internal components region; a pull-tab coupled to the controller and extending outside of the apparatus, wherein: the controller is configured to switch from the sender mode to the recipient mode when the pull-tab is decoupled from the controller, when the controller is in the sender mode, the controller is configured to start playing a pre-recorded sound through the speaker when the switch moves from the first state to the second state and to stop playing the pre-recorded sound after a set period of time, and when the controller is in the recipient mode, the controller is configured to start playing a pre-recorded sound through the speaker when the switch moves from the first state to the second state and to continue playing the pre-recorded sound until the battery is discharged.

In a fifty-sixth embodiment, the apparatus of embodiment 52 wherein the set period of time is less than or equal to 10 seconds.

In a fifty-sixth embodiment, the apparatus of embodiment 52 wherein the protective cover comprises a blister top comprising at least one of a flexible plastic sheet or a polymer cap having a flexural modulus greater than or equal to 0.5 GPa at 72 degrees Fahrenheit.

In general, the word "controller," as used herein, refers to logic embodied in hardware or firmware, or to a collection of software instructions, possibly having entry and exit points, written in a programming language, such as, for example, Java, C or C++. A software controller may be compiled and linked into an executable program, installed in a dynamic link library, or may be written in an interpreted programming language such as, for example, BASIC, Perl, or Python. It will be appreciated that controllers can include software modules that may be callable from other modules or from themselves, and/or may be invoked in response to detected events or interrupts. Software instructions may be embedded in firmware, such as an EPROM. It will be further appreciated that hardware controllers may be comprised of connected logic units, such as gates and flip-flops, and/or may be comprised of programmable units, such as programmable gate arrays or processors. The controllers described herein may be represented in software, hardware, or firmware. Generally, the controllers described herein can include logical modules that may be combined with other modules or divided into sub-modules despite their physical organization or storage.

The various illustrative logical blocks, controllers, data structures, and processes described herein may be implemented as electronic hardware, computer software, or combinations of both. To clearly illustrate this interchangeability of hardware and software, various illustrative components, blocks, modules, and states have been described above generally in terms of their functionality. However, while the various modules are illustrated separately, they may share some or all of the same underlying logic or code. Certain of the logical blocks, controllers, and processes described herein may instead be implemented monolithically.

The various illustrative logical blocks, modules, data structures, and processes described herein may be implemented or performed by a machine, such as a computer, a processor, a digital signal processor (DSP), an application specific integrated circuit (ASIC), a filed programmable gate array (FPGA) or other programmable logic device, discrete gate or transistor logic, discrete hardware components, or any combination thereof designed to perform the functions described herein. A processor may be a microprocessor, a controller, a microcontroller, a state machine, combinations of the same, or the like.

Depending on the embodiment, certain acts, events, or functions of any of the processes or algorithms described herein can be performed in a different sequence, may be added, merged, or left out altogether. Thus, in certain embodiments, not all described acts or events are necessary for the practice of the processes. Moreover, in certain embodiments, acts or events may be performed concurrently, e.g., through multi-threaded processing, interrupt processing, or via multiple processors or processor cores, rather than sequentially.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Thus, it is intended that the scope of the inventions herein disclosed should not be limited by the particular embodiments described above.

The following is claimed:

1. An apparatus configured to continuously play a pre-recorded sound through a speaker until a battery is discharged, the apparatus comprising:

- a first panel comprising a first inner surface;
- a second panel comprising a second inner surface;
- a pouch disposed along the first inner surface, the pouch comprising a separable coupling along a surface of the pouch, the separable coupling configured to open the pouch in response to a separation of the separable coupling, wherein, in an opened configuration of the apparatus, the pouch and the separable coupling are exposed to a user of the apparatus and wherein, in a closed configuration of the apparatus, the pouch and the separable coupling are hidden from the user;
- a sound playback system comprising:
  - the speaker;
  - a controller coupled to the speaker, wherein the controller implements a temporary mode of operation and a permanent mode of operation, wherein the controller comprises instructions comprising at least one of a plurality of stopping criteria, and wherein, in the temporary mode of operation, the controller is configured to play the pre-recorded sound through the speaker until the at least one stopping criteria is met, wherein the plurality of stopping criteria comprises:
    - the controller playing the pre-recorded sound through the speaker for a specified amount of time;
    - the controller playing a loop of the pre-recorded sound through the speaker a specified number of times;
    - user interaction with the apparatus to transition the apparatus from the opened configuration to the closed configuration; and
    - user interaction with a sound-stop user interface element; and
  - the battery configured to provide electric power to the controller, wherein, in the permanent mode of operation, the controller is configured to continuously play the pre-recorded sound through the speaker until the battery is discharged; and a mode of operation switch operatively coupled to the controller, wherein, in response to a user operating the mode of operation switch, the controller is configured to switch from the temporary mode of operation to the permanent mode of operation, wherein, after the user operates the mode of operation switch, the mode of operation switch cannot be switched from the permanent mode of operation to the temporary mode of operation, and wherein the pre-recorded sound cannot be turned off via user operation of the mode of operation switch.

2. The apparatus of claim 1, wherein the pouch comprises a sealing material configured to prevent fluid entering therein.

3. The apparatus of claim 2, wherein the sealing material comprises acetate.

4. The apparatus of claim 1, wherein the mode of operation switch is configured to be decoupled from the controller.

5. The apparatus of claim 1, wherein the pouch is adhered to at least one of the first inner surface or the second inner surface of the apparatus.

6. The apparatus of claim 1, wherein the first panel and the second panel are at least partially made of paper or cardboard.

7. The apparatus of claim 1, wherein the mode of operation switch can only be operated once.

8. The apparatus of claim 7, wherein the mode of operation switch comprises a tab accessible and removable by a sender of the apparatus.

9. The apparatus of claim 8, wherein the tab is operatively coupled to a circuit that activates the permanent mode of operation when the circuit is closed by removal of the tab.

10. The apparatus of claim 9, wherein the tab comprises an electrical insulator that separates leads in the circuit.

11. The apparatus of claim 8, wherein the mode of operation switch is configured to protrude through a slit or opening of the apparatus.

12. The apparatus of claim 1, further comprising a fold line disposed between the first panel and the second panel, and wherein the pouch is hidden from view when the apparatus is folded along the fold line.

13. An apparatus configured to contain a gift, the apparatus comprising:

a first panel comprising a first inner surface;

a second panel comprising a second inner surface, wherein the first panel is rotationally coupled to a first edge of the second panel;

a switch coupled to the first and second inner surfaces, wherein rotating the first panel causes the switch to move between a first state and a second state;

a third panel comprising a third inner surface, wherein the third panel is coupled to a second edge of the second panel;

a liner covering the second and third inner surfaces; and a sound playback system positioned between the liner and the third inner surface, wherein:

the sound playback system comprises a speaker, a battery, and a controller connected to the speaker, the switch, and the battery, the controller is operable in a safe mode of operation and a recipient mode of operation, the battery is configured to provide electric power to the controller, when the controller is in the safe mode of operation, the controller is configured to start playing a pre-recorded sound through the speaker when the switch moves from the first state to the second state and to stop playing the pre-recorded sound when the switch moves from the second state to the first state, and when the controller is in the recipient mode of operation, the controller is configured to start playing the pre-recorded sound through the speaker when the switch moves from the first state to the second state and to continue playing the pre-recorded sound until the battery is discharged.

14. The apparatus of claim 13 further comprising a mode-of-operation switch coupled to the controller, wherein the controller is configured to switch from the safe mode of operation to the recipient mode of operation in response to a user activating the mode-of-operation switch.

15. The apparatus of claim 14, wherein:

the third panel comprises a slot extending through the third panel, the mode-of-operation switch is coupled to a pull-tab that extends through the slot, and the user activates the mode-of-operation switch by pulling the pull-tab through the slot until the pull-tab decouples from the mode-of-operation switch.

16. The apparatus of claim 13, further comprising an internal components cover comprising rigid plastic interposed between the liner and internal components.

17. The apparatus of claim 16, wherein the internal components cover is at least partially adhered to the third inner surface.

18. The apparatus of claim 16 further comprising a pouch filled with glitter positioned between the liner and the internal components cover.

19. The apparatus of claim 18, wherein:

the pouch comprises a top sheet attached to a bottom sheet, the glitter is contained between the top and bottom sheets, the top sheet is at least partially adhered to the liner, and the bottom sheet is at least partially adhered to the internal components cover.

20. A greeting card configured to expose a hidden payload in response to a separation of a separable coupling, the greeting card comprising:

a first panel comprising:

a first inner surface;

a first outer surface; and a plurality of flaps;

a second panel comprising a second inner surface and a second outer surface;

a fold line disposed between the first panel and the second panel;

a pouch coupled to the first inner surface of the first panel, the pouch comprising a hidden payload, wherein in a folded configuration the first and second inner surfaces are folded along the fold line and the pouch is disposed therebetween, and wherein in the folded configuration, the plurality of flaps are configured to wrap around and couple to the second outer surface; and a separable coupling accessible to a user in the folded configuration, the separable coupling comprising a perforated perimeter, coupled to the first panel, and disposed along a bottom portion of the pouch, wherein, with the greeting card opened and in the folded configuration, the separable coupling is configured to be pulled by a recipient to separate the separable coupling from the first panel and open the pouch to expose the hidden payload.

* * * * *